United States Patent [19]

Tanaka et al.

[11] Patent Number: 5,050,936
[45] Date of Patent: * Sep. 24, 1991

[54] REGENERATIVE BRAKING SYSTEM FOR CAR

[75] Inventors: Koji Tanaka; Takashi Shima, both of Toyko, Japan

[73] Assignee: Isuzu Motors Limited, Toyko, Japan

[*] Notice: The portion of the term of this patent subsequent to Jun. 18, 2008, has been disclaimed.

[21] Appl. No.: 424,723

[22] Filed: Oct. 20, 1989

[30] Foreign Application Priority Data

Oct. 27, 1988 [JP] Japan .................. 63-271528
Oct. 28, 1988 [JP] Japan .................. 63-272750

[51] Int. Cl.⁵ .................. B60T 1/10; B60T 8/00
[52] U.S. Cl. .................. 303/3; 180/165; 303/100; 364/426.04
[58] Field of Search .................. 180/53.4, 53.7, 54, 180/165, 302; 188/156, 159, 195; 192/3.56, 3.58, 4 RE; 303/3, 20, 93, 100, 101; 318/376, 370, 382; 364/426.01, 426.04; 417/217, 218

[56] References Cited

U.S. PATENT DOCUMENTS

| | | | |
|---|---|---|---|
| 4,433,703 | 2/1984 | Beutler et al. | 417/218 |
| 4,512,615 | 4/1985 | Kita et al. | 364/426.01 |
| 4,741,410 | 5/1988 | Tunmore | 180/165 |
| 4,757,449 | 7/1988 | Kurihara et al. | 364/426.04 |

FOREIGN PATENT DOCUMENTS

| | | |
|---|---|---|
| 61-175150 | 8/1986 | Japan . |
| 61-175151 | 8/1986 | Japan . |
| 61-175152 | 8/1986 | Japan . |
| 61-175153 | 8/1986 | Japan . |
| 61-175154 | 8/1986 | Japan . |
| 62-15128 | 1/1987 | Japan . |
| 62-18324 | 1/1987 | Japan . |
| 62-18325 | 1/1987 | Japan . |
| 62-18326 | 1/1987 | Japan . |
| 62-18327 | 1/1987 | Japan . |
| 62-31522 | 2/1987 | Japan . |
| 62-31523 | 2/1987 | Japan . |
| 62-34819 | 2/1987 | Japan . |
| 62-37215 | 2/1987 | Japan . |
| 62-37216 | 2/1987 | Japan . |
| 62-37217 | 2/1987 | Japan . |
| 62-37218 | 2/1987 | Japan . |
| 62-39325 | 2/1987 | Japan . |
| 62-39326 | 2/1987 | Japan . |
| 62-39327 | 2/1987 | Japan . |

OTHER PUBLICATIONS

1979 Society of Automotive Engineers, Inc., "Improvement of Citybus Fuel Economy Using a Hydraulic Hybrid Propulsion System-A Theoretical and Experimental Study", by P. Buchwald et al., pp. 1-15.
1985 Society of Automotive Engineers, Inc., "Predicting the Retardation Performance of Vehicles Equipped with Hydro-Pneumatic Energy Storage System", by Anthony S. Davies et al., pp. 2.516-2.523.
1985 Society of Automotive Engineers, Inc., "Studies of an Accumulator Energy-Storage Automobile Design with a Single Pump/Motor Unit", by S. Tollefson et al., pp. 1-9.
1985 Society of Automotive Engineers, Inc., "Fuel Economy and Operating Characteristics of a Hydropneumatic Energy Storage Automobile", Peirong Wu et al., pp. 1-10.
Automotive Engineering, vol. 92, No. 10, Oct. 1984, *International Viewpoints*, "Regenerative Braking for Buses Gives Big Fuel Saving", by David Scott and Jack Yamaguchi, pp. 95-99.

(List continued on next page.)

Primary Examiner—Matthew C. Graham
Attorney, Agent, or Firm—Staas & Halsey

[57] ABSTRACT

A regenerative braking system for a car in which overall braking torque required for a pump/motor is determined and the pump/motor is controlled to have its maximum pumping capacity. An electromagnetic proportional air control valve is used to supplement the short capacity when the pumping capacity for the overall braking torque exceeds the maximum capacity and a brake pedal is operated. The control valve is exclusively used for conventional braking in response to the position of the brake pedal when the car speed is below a predetermined low speed.

17 Claims, 20 Drawing Sheets

OTHER PUBLICATIONS

Commercial Motor, Jan. 24, 1987, *Brakes Developments,* "Braking New Ground", pp. 35–36.

"Cumulo Bus for London", Dec. 1985, p. 537.

Automotove Engineering, vol. 87, No. 10, Oct. 1979, *International Viewpoints,* "Regenerative Braking Cuts Bus Fuel Needs", by David Scott, pp. 102–107.

ATZ Automobiltechnische Zeitschrift 80 (1978) 12, "Hydro-Bus-Ein Stadtlinienbus mit Hydrostatischer Bremsenergieruckgewinnung", by Thomas Thier et al., pp. 597–600.

ATZ Automobiltechnische Zeitschrift 81 (1979) 7/8, "Antriebe zur Bremsenergie-Ruckgewinnung bei Omnibussen", by Faust Hagin et al., pp. 327–330.

University of Queensland, May 1984, Department of Mechanical Engineering, (Drawing of FIG. 4) "Optimisation of a Regenerative Energy Storage System for a 10 Tonne Bus", by M. K. Vint.

University of Queensland, Aug. 1986, Department of Mechanical Engineering, "Overview of the Design and Installation of a Regenerative Braking, Storage and Propulsion System for a Leyland Panther Bus", by M. K. Vint, pp. (i)–5.

"Transmission of Engine/Flywheel Hybrid Vehicles" by Tsuneji Yada, vol. 37, No. 3, 1983, pp. 274–281.

"Regenerative Systems for Braking Energy", by Yuzuru Matsuura, vol. 32, No. 5, 1978, pp. 410–416.

FIG. 15

FLAG FL_SPEED

| BIT | INDICATED CAR SPEED |
|---|---|
| b 0 | SET AT STOPPAGE |
| b 1 | SET WHEN $V \leq 2$ Km/h |
| b 2 | SET WHEN $2$ Km/h $< V \leq 10$ Km/h |
| b 3 | SET WHEN $10$ Km/h $< V \leq 20$ Km/h |
| b 4 | SET WHEN $20$ Km/h $< V \leq 30$ Km/h |
| b 5 | SET WHEN $30$ Km/h $< V \leq 40$ Km/h |
| b 6 | SET WHEN $40$ Km/h $< V \leq 50$ Km/h |
| b 7 | SET AT 50 Km/h |

FIG. 16
FLAG FL_RBS

| BIT | SET CONDITION | RESET CONDITION |
|---|---|---|
| b0 | AT ENTRANCE INTO ENERGY RECOVERY MODE | AT ENTRANCE INTO OTHER MODES |
| b1 | AT ENTRANCE INTO ENERGY REGENERATIVE MODE | |
| b2 | AT ENTRANCE INTO CONVENTIONAL BRAKE CONTROL MODE | |
| b3 | AT REQUIRING CLUTCH TO BE DECOUPLED | AT ENABLING CLUTCH TO BE COUPLED |

FIG. 17

FLAG FL_PEDAL

| BIT | 0 | 1 | RESET CONDITION |
|---|---|---|---|
| b0 (BRK1) | NEW ENERGY RECOVERY CONTROL | CONTROL LATER THAN 2ND | CONVENTIONAL BRAKE CONTROL/AT THE HEAD OF ENERGY REGENERATIVE CONTROL |
| b1 (BRK2) | UNNECESSARY BRAKING | NECESSARY BRAKING | |
| b2 (ACC1) | NEW ENERGY REGENERATIVE CONTROL | CONTROL LATER THAN 2ND | CONVENTIONAL BRAKE CONTROL/AT THE HEAD OF ENERGY RECOVERY CONTROL |
| b3 (ACC2) | | | |

5,050,936

REGENERATIVE BRAKING SYSTEM FOR CAR

CROSS REFERENCE TO RELATED APPLICATION

This application is related to our U.S. application Ser. No. 07/424,554, filed Oct. 20, 1989.

BACKGROUND OF THE INVENTION

The present invention relates to a regenerative braking system for a car, and particularly to a regenerative braking system for a car wherein the decelerating energy of a car is captured and used for the starting/accelerating energy.

In a PTO (Power-take-off) output unit (system) or a deceleration energy recovery system as conventionally known, a part of the kinetic energy dissipated mainly as heat at a brake or engine during the deceleration of a car is captured in the form of hydraulic operating oil and accumulated in an accumulator. The accumulated energy is utilized for the starting energy and accelerating energy of the car.

For example, in 1976 C. J. Lorence Corporation in England announced the development of such a system using a bus of British Leyland Corporation. Since then, various research and development has been conducted in Europe.

Recently, Japanese Patent Application Laid-open Nos. 62-15128, 62-37215, and 62-39327 have disclosed a deceleration energy recovery system which is essentially formed of a transmission (hereinafter referred to as T/M), a multi-stage gear-changed PTO unit, a PTO output shaft, a pump/motor, a hydraulic oil circuit, an electromagnetic clutch, an accumulator, and a control unit.

The T/M includes a counter shaft driven through an engine clutch, a main shaft connected to a wheel driving line, and a multi-staged gear train mechanism transferring the rotation of the counter shaft to the main shaft through the gears. The multi-stage gear-changed PTO unit includes a counter shaft PTO gear disconnectably coupled to the counter shaft through a counter shaft PTO gear synchronizer, a main shaft PTO gear coupled to the counter shaft PTO gear and disconnectably coupled to the main shaft through a main shaft PTO gear synchronizer, and a PTO output shaft driven through driving gears coupled to the main shaft PTO gear. The pump/motor is coupled to the PTO output shaft, the hydraulic oil circuit consists of a high pressure oil line and a low pressure oil line and serves to connect the accumulator to an oil tank through the pump/motor, and the electromagnetic clutch serves to connect/disconnect the oil circuit to/from the PTO shaft.

The control unit controls the electromagnetic clutch and works the pump/motor as either a pump or a motor in response to the running condition of the car. Namely, for working the pump/motor as a pump, the torque of the wheels during the decelerating mode serves to accumulate the operating oil into the accumulator through the PTO unit, thereby to capture the kinetic energy, i.e. braking energy mainly lost as heat in the brake or engine, and for working the pump/motor as a motor, the operating oil accumulated in the accumulator serves to generate starting/accelerating torque to drive the wheels through the PTO unit.

The control manner of this control unit is as follows:

① When the car starts with the inner pressure of the accumulator being sufficient, the pump/motor is controlled to serve as a variable capacity type motor, the capacity of which is controlled by varing the displacement angle (incline angle) of the swash plate or shaft in response to the accelerator pedal positions.

Since the pump/motor is also connected to the electromagnetic clutch, when the electromagnetic clutch is coupled to the PTO unit by the control unit, the pump/motor drives the car based on the hydraulic power accumulated in the oil circuit.

In the meantime, when the car speed exceeds a preset value corresponding to the gear position selected by a driver, the engine clutch is coupled to the engine for the engine cruising. At the same time the PTO unit is gear-changed so as to turn off the counter shaft synchronizer which was on, and turn on the main shaft synchronizer which was off, and the combined crusing of the pump/motor with the engine is carried out according to the hydraulic power based on the pedal position only if the accelerator pedal is largely operated by the foot.

② During the braking mode, the electromagnetic clutch is made on, and the displacement angle control signal (pump capacity control signal) according to the brake pedal position is supplied to the pump/motor for the corresponding pumping operation, while at the same time the engine is declutched.

Thus, the control unit controls the engine clutch to decouple the engine from the driving line of the wheels in order to capture a part of the braking energy which is to be consumed in the engine during the braking mode and to relieve the captured energy during the accelerating mode, while coupling the engine to the driving line in order to use the engine power solely or in combination with the motor during the starting/accelerating mode.

In such prior art structures, although the braking operation by the hydraulic power is necesarily performed by the pump/motor as long as the car speed is not null and the brake pedal is operated by the foot, it is disadvantageous to effect hydraulic braking and/or engine braking without taking measures to meet the case where the maximum hydraulic braking torque is smaller than the required braking torque and therefore a sufficient braking power cannot be obtained by a large operation of the brake pedal.

It is also disadvantageous that since a hydraulic braking operation is continued even for a low car speed, the hydraulic system is frequently used particularly when the car cruises at a low speed, such as in a traffic jam where the energy recovered is little, resulting in the deterioration of the durability of the system.

SUMMARY OF THE INVENTION

It is accordingly an object of the present invention to provide a regenerative braking system for a car which can generate the necessary braking energy at any time.

It is another object of the present invention to provide a regenerative braking system for a car which prevents unnecessary hydraulic braking where conventional braking is performed.

According to the present invention, as conceptually shown in FIG. 1A, control means 64 determines overall braking torque required for a pump/motor 14 forming a hydraulic oil circuit together with a high pressure accumulator 26, a circuit valve 25, a pump/motor 14, and a low pressure accumulator 27, and determines the pumping capacity of the pump/motor 14 in the braking mode from the overall braking torque.

When the pumping capacity as determined exceeds the maximum capacity of the pump/motor 14, the control means 64 fixes the pumping capacity of the pump/motor 14 at the maximum to effect hydraulic braking as shown in the figure.

At the same time, when a brake pedal 57 is operated by the foot, whereby sensing means 58 for the position of the brake pedal 57 senses the operation of the brake pedal 57, the control means 64 determines the short braking torque obtained from the required overall braking torque minus the braking torque corresponding to the maximum pumping capacity.

Then, the control means 64 decouples the engine 1, couples an electromagnetic clutch 13 to a PTO unit 8, and controls an electromagnetic proportional air pressure control valve 70 according to the short braking torque to enable means 100 for generating air braking to supplement the short braking torque.

Thus, the shortage of braking force in the hydraulic circuit can be supplemented by air braking force.

Also, according to the present invention, the control means 64 control the control valve 70 in response to the output of the sensing means 58 for the position of the brake pedal 57 when the car speed from sensing means for car speed is below a predetermined low speed.

At the same time, the control means 64 interrupts the hydraulic oil circuit, which is carried out by opening the circuit valve 25 or by making zero the capacity of the pump/motor 14.

Thus, the hydraulic braking is not effected even though the brake pedal is operated by the foot when the car cruises at a low speed, but is replaced by the air braking. When the car cruises at a lower speed after hydraulic braking has been effected, the hydraulic circuit is also interrupted.

Therefore, at a low car speed in which the rotation of the pump/motor 14 is unstable and the hydraulic braking is less beneficial, the hydraulic braking is avoided.

BRIEF DESCRIPTION OF THE DRAWINGS

The present invention will be more apparent to those skilled in the art, from the following drawings in which:

FIG. 15 is a chart for explaining flag FL-SPEED;

FIG. 16 is a chart for explaining flag FL-RBS;

FIG. 17 is a chart for explaining flag FL-PEDAL; and,

Throughout the figures, the same reference numerals indicate identical or corresponding portions.

DETAILED DESCRIPTION OF THE PREFERRED EMBODIMENTS

There will now be described the embodiments of a regenerative braking system for a car according to the present invention.

Figure 1A:
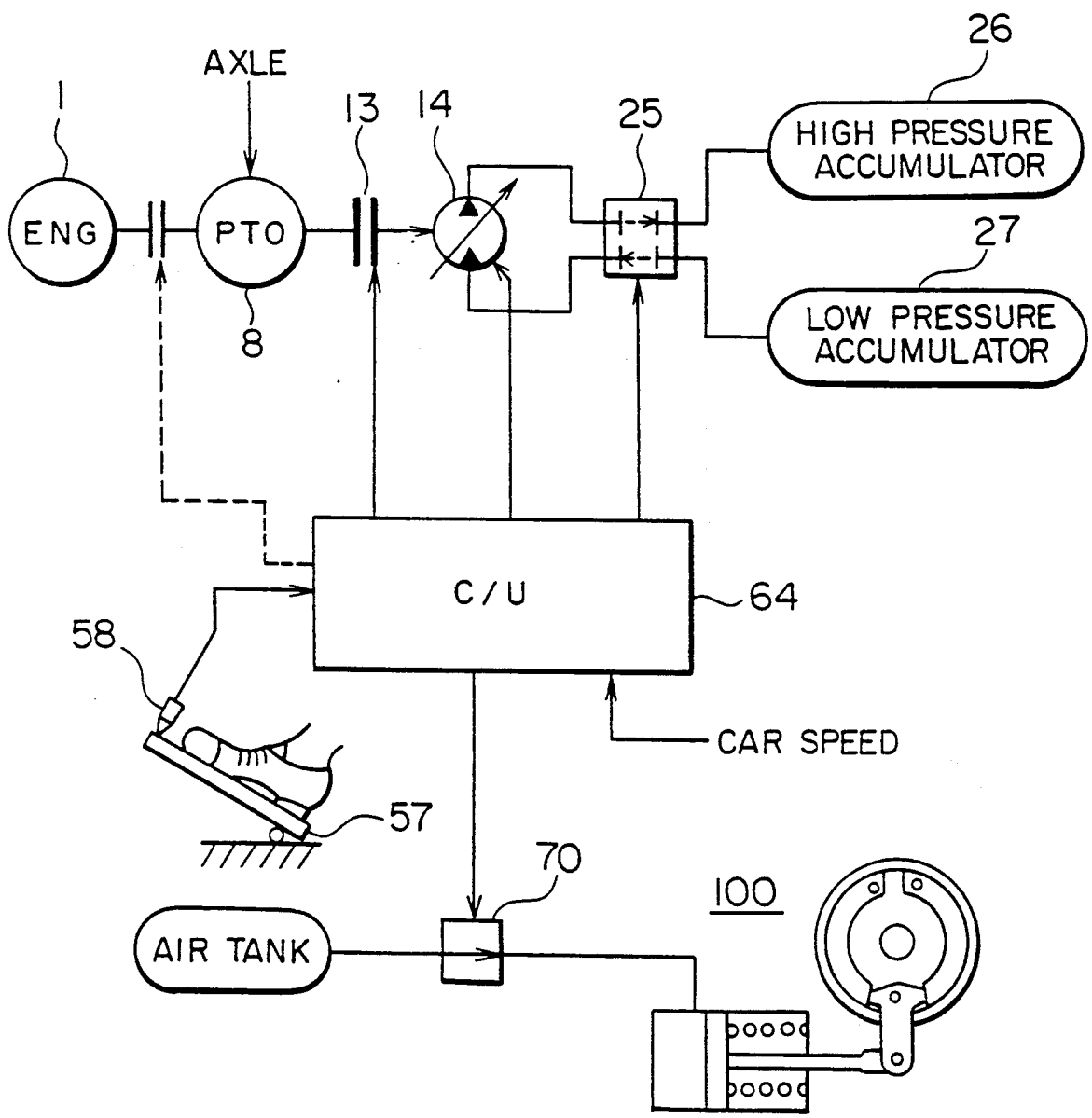
FIG. 1A is a conceptual diagram of a regenerative braking system for a car in accordance with the present invention.
Figure 1B:
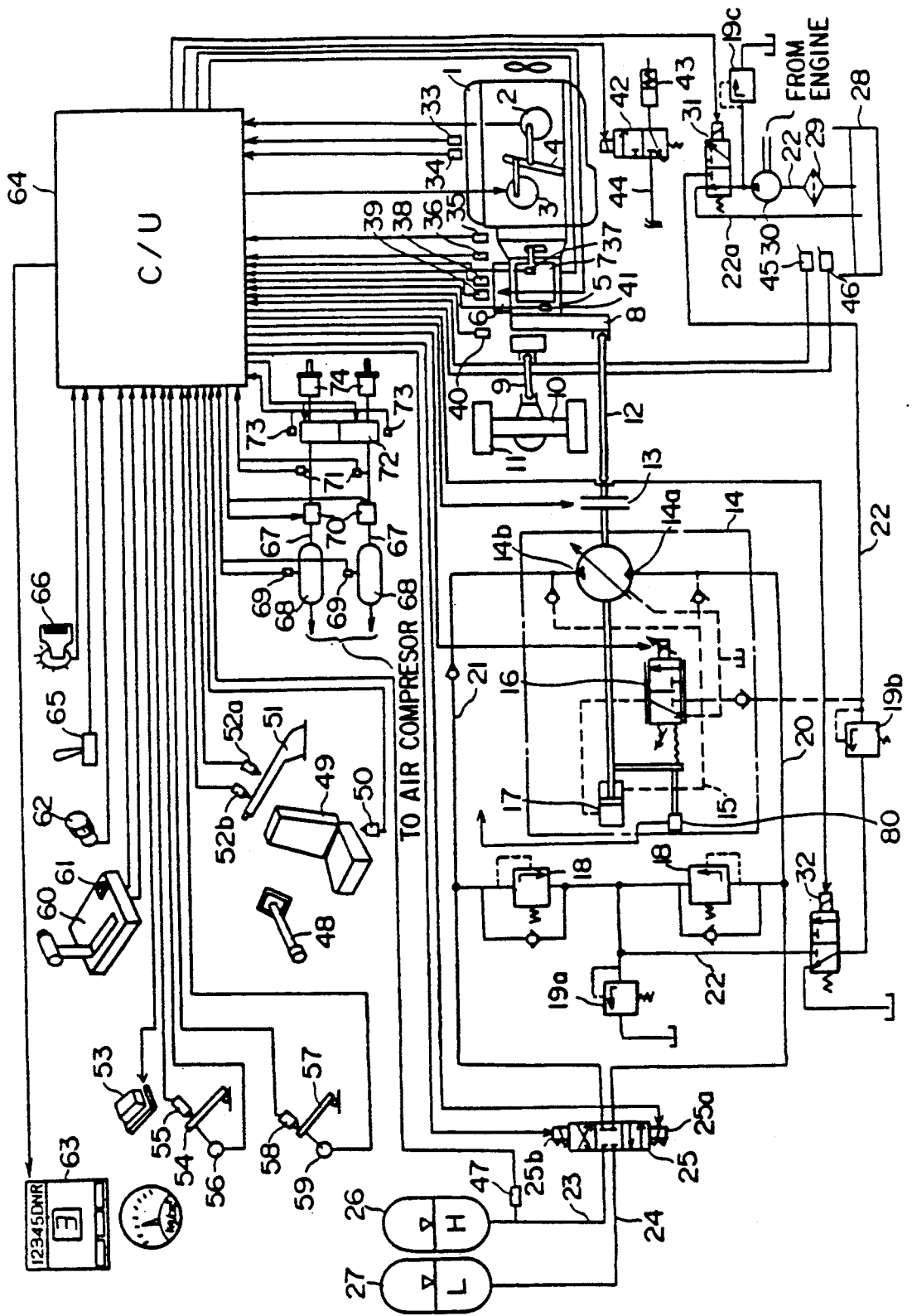
FIG. 1B is a block diagram of an embodiment of a regenerative braking system for a car in accordance with the present invention.

Referring now to FIG. 1B, this overall arrangement of the regenerative braking system (hereinafter referred to as RBS) include; an engine 1; a load sensor 2 for the engine 1; a step motor 3 responsive to the position of an accelerator pedal 54; an injection pump lever 4 which is controlled by the step motor 3 to set the fuel supply into the engine 1 and is connected to the load sensor 2; a T/M (gearbox) 5 which provides, as an output, the changed rotation of the engine 1; a gear shift actuator 6 which automatically changes the gear ratio of the T/M 5; a clutch actuator 7 which automatically couples/decouples the engine clutch (not shown); a PTO unit 8 connected to the T/M 5; a propeller shaft 9 forming the driving line for wheels 11 together with an axle 10; a PTO shaft 12 of the PTO unit 8; an electromagnetic clutch 13; a well-known pump/motor 14 of a variable capacity swash plate type which is connected to the PTO unit 8 through the PTO shaft 12 and the electromagnetic clutch 13, and is combined with a displacement (incline) angle controlling pilot piping 15, a displacement angle controlling electromagnetic proportional valve 16, and a displacement angle controlling piston 17, and which has a suction port 14a and a discharge port 14b; and a displacement angle sensor 80 for sensing the displacement angle of the pump/motor 14.

Figure 2A:
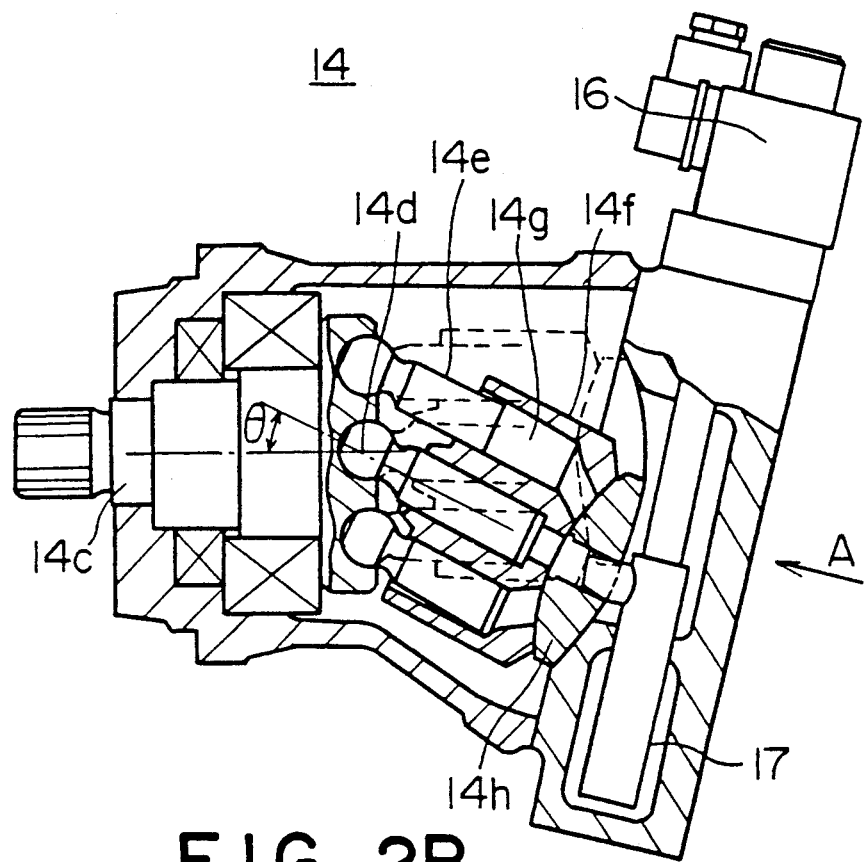
FIGS. 2A and 2B are respectively a sectional view and a perspective view of a swash shaft type pump/motor used for the present invention.
Figure 2B:
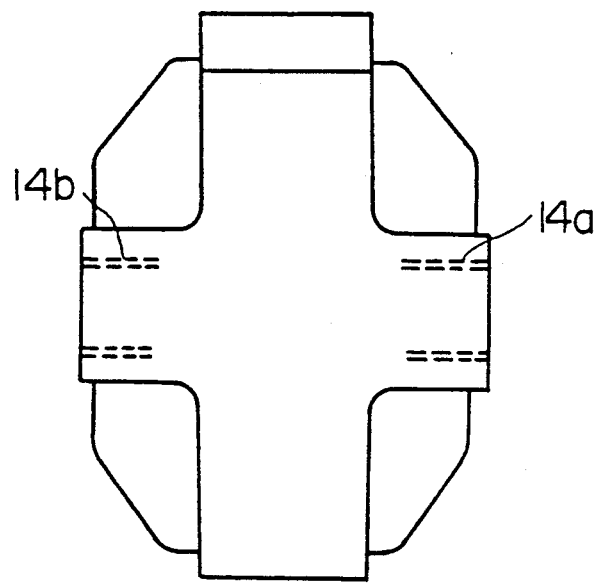

Now describing the pump/motor 14 on the basis of FIG. 2A and FIG. 2B seen from the direction by arrow A in FIG. 2A, a shaft 14d connected to an output shaft 14c is inserted into the central aperture of a cylinder block 14f, the opposite side of which is connected to the piston 17 through a port plate 14h. Also, the cylinder block 14f is provided at the periphery with a plurality of cylinders 14g each having one end slidably inserted with pistons 14e connected to the output shaft 14c and another end connected through the port plate 14h to the suction port 14a or the discharge port 14b shown in FIG. 2B.

The piston 17 as above noted is movable in the up-/down direction by the pressure of the operating oil supplied to the lower portion of the piston 17 from the pilot piping 15 or the operating oil within the oil pipings 20, 21 in proportion to the controlling current supplied to the electromagnetic proportional valve 16. Therefore, the assembly consisting of the cylinder block 14f, the piston 14e, the shaft 14d, and the port plate 14h varies its angle in accordance with the up/down movement of the controlling piston 17 connected to the output shaft 14c, where the angle θ formed by the output shaft 14c and the shaft 14d is called the above noted displacement angle.

FIG. 2A shows the case where the electromagnetic proportional valve 16 is supplied with the maximum control current, which provides the maximum displacement angle whereby the discharge amount per revolution of the output shaft 14c leads to the maximum. In the case where the electromagnetic proportional valve 16 has null control current therein, the displacement angle becomes null as shown by the dotted line, which leads to a null discharge amount.

Back to FIG. 1B, the RBS futher includes; a high pressure relief valve 18 for relieving the accumulation of a high pressure accumulator 26 which will be hereinafter mentioned, when it exceeds a set value; a low pressure relief valve 19a for relieving the supply pressure of the operating oil of a replenishing circuit when it exceeds a set value; a low pressure relief valve 19b for creating pilot pressure required for displacing the capacity of the pump/motor 14 into the pilot piping 15; a piping 20 on the suction side of the pump/motor 14; a piping 21 on the discharge side of the pump/motor 14; a replenishing piping 22 for the operating oil; a return piping 22a for the operating oil; a high pressure side piping 23; a low pressure side piping 24; a circuit change-over valve 25 for changing over the above pipings 20~24; a high pressure accumulator 26 connected to the circuit change-over valve 25 through the high pressure side piping 23; and a low pressure accumulator 27 which is connected to the circuit change-over valve 25 through the low pressure side piping 24 and forms a hydraulic oil circuit together with the above pump/motor 14, the circuit change-over valve 25, and the high pressure accumulator 26.

It is to be noted that the circuit change-over valve 25 is necessary for changing over the pumping mode to the motoring mode with the suction/discharge port of the pump/motor 14 being unchanged, and can be replaced by a circuit shut-off valve if the pump/motor 14 is of a reversible type. The circuit change-over valve and circuit shut-off valve can be generally called a circuit valve.

Referring to the change-over operation of the pipings by the circuit change-over valve 25, when neither of the electromagnets 25a and 25b is excited, the valve 25 takes the position shown in the central portion in FIG. 1B from among three valve positions, for the isolation between four pipings 20, 21, 23, and 24.

To recover the braking energy, the electromagnet 25a is excited to change-over the valve position to the side of the electromagnet 25a. Then, the low pressure accumulator 27 can be interconnected with the suction port 14a of the pump/motor 14 through the pipings 24, 20 and the high pressure accumulator 26 can be interconnected with the discharge port 14b of the pump/motor 14 through the pipings 23, 21. Accordingly, the operating oil accumulated in the low pressure accumulator 27 is pumped by the pump/motor 14 working as a pump driven by the braking energy, and is accumulated into the high pressure accumulator 26.

On the contrary, to work the pump/motor 14 as a motor, the electromagnet 25b of the circuit change-over valve 25 is excited to change-over the valve to the position on the side of the electromagnet 25b. Then, the low pressure accumulator 27 can be interconnected with the discharge port 14b of the pump/motor 14 through the pipings 24, 21 and the high pressure accumulator 26 can be interconnected with the suction port 14a of the pump/motor 14 through the pipings 23, 20. As a result, the operating oil accumulated in the high pressure accumulator 26 passes through the pipings 23, 20 to rotate the pump/motor 14 as a motor, and then passes through the pipings 21, 24 to reach the low pressure accumulator 27 for the accumulation therein.

The RBS in FIG. 1B further includes: a drain tank 28 and a filter 29 for the operating oil; a replenishing pump 30 for the operating oil driven by the engine 1; electromagnetic valves 31 and 32 which are provided on the replenishing piping 22, supply the operating oil returned to the drain tank from the hydraulic oil circuit to the hydraulic oil circuit, and supply the pilot oil pressure through the pilot piping 15 to the pump/motor 14.

Furthermore, there are provided: a directly coupled cooling relay switch 33; a water coolant temperature sensor 34 for the engine 1; a rotational speed sensor 35 for the engine 1; a rotational speed sensor 36 for the input shaft; a clutch stroke sensor 37 for the T/M 5; a gear position sensor 38; a gear-shift stroke sensor 39; a car speed sensor 40 as a car speed sensing means; an oil temperature sensor 41 for the T/M 5; an exhaust brake control valve 42; a cylinder 43 for driving an exhaust brake valve (not shown); an air piping 44 for supplying air pressure for the cylinder 43 through the exhaust brake control valve 42; and limit switches 45 and 46 provided in the drain tank 28 to detect the drain quantity; a pressure sensor 47 for sensing the pressure of the operating oil accumulated in the high pressure accumulator 26. It is to be noted that the gear position sensor 38 and the gear-shift stroke sensor 39 form gear position sensing means.

Finally, there are provided: a hand lever 48 for actuating exhaust braking; a driver's seat 49; an off-seat detection switch 50 for detecting whether or not the driver has left the driver's seat 49; a parking brake lever 51; a parking brake switch 52a and 52b a main switch 53 for the RBS; an accelerator pedal 54; an idle position detecting switch 55; an accelerator pedal position sensor 56; a brake pedal 57, a brake pedal return position detecting switch 58 (hereinafter simply referred to as a brake pedal switch); a brake pedal position sensor 59 which can also serve as a brake pedal switch; a gear selection lever 60; a switch 61 of a hill-start-aid apparatus (hereinafter referred to as HSA); an idle control switch 62; an indicator group 63; a door switch 65; a key switch 66; a brake air piping 67; a brake air tank 68; a brake air pressure sensor 69; an electromagnetic proportional pressure control valve 70; air pressure switches 71 and 73; an HSA valve 72; an air master cylinder 74; and a control unit 64 (hereinafter referred to as C/U) as control means for controlling the pump/motor 14 and the above noted various actuators on the basis of the outputs of the above noted sensors and switches to recover the braking energy. It is to be noted that C/U 64 includes a memory (not shown) for storing programs, maps, and flags which will be mentioned.

Figure 3:
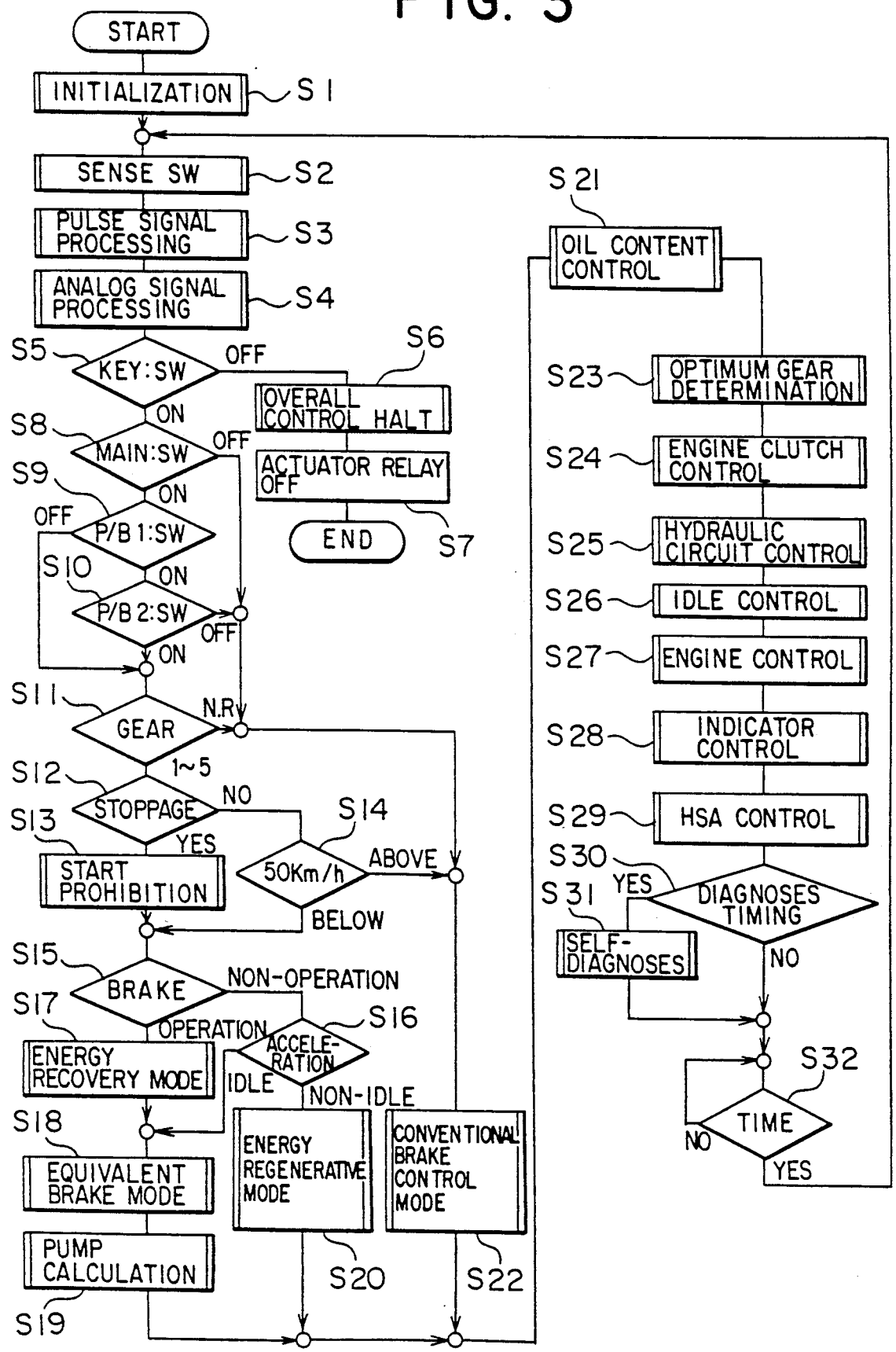
FIG. 3 is a flow chart of an entire program stored in and executed by control means according to the present invention.

FIG. 3 shows an overall program flow chart stored in and executed by the C/U 64 shown in FIG. 1, based on which the operation of the embodiment shown in FIG. 1 will be described.

Starting the program, the C/U 64 executes an intialization subroutine in which all of the outputs are reset and a RAM (not shown) included therein is also reset (FIG. 3, step S1).

After the execution of the initialization, a subroutine for reading the signals from the above noted switches 33, 45, 46, 50, 52a, 52b, 53, 55, 58, 61, 62, 65, 66, 71 and 73 as well as the sensor 38, is executed (step S2). Then a processing subroutine for the rotational signal (pulse) read from the sensors 35, 36, and 40 is executed to calculate the engine rotational speed, the input shaft rotational speed and the car speed (step S3). This step creates flags FL-SPEED corresponding the car speed as shown in FIG. 15 which will be described below.

Then, a processing subroutine for analog signals read from the sensors 2, 34, 37, 39, 41, 47, 56, 59, 69 is executed to determine, in digital form, the engine load, the clutch stroke, the shift stroke, the oil temperature, the oil pressure, the acclerator pedal position, the brake pedal position, and the brake air pressure (step S4).

Data obtained by the reading operations and the processing of these signals is updated each C/U processing period. Also, flags (hereinafter mentioned) are set based on the signals as read and processed in those subroutines.

Next, it is checked whether or not the key switch 66 is on (step S5), and if it is off, an overall control halt subroutine will be executed (step S6). This subroutine stops the overall control by the interruption of the electric power of the C/U 64 with the actuator relay (not shown) being made off in step S7 after the hydraulic oil system has completely resumed its safe condition, for the sake of safety even if the key switch 66 is made off in the stopping or running mode.

If it is found in step S5 that the key switch 66 is on, it is then checked whether or not the RBS main switch 53 is on (step S8), and if it is off, a conventional brake control mode subroutine as will be mentioned below is executed (step S22). If it is on, the control will be continued assuming that the driver intends to carry out the operation of the RBS.

Namely, the C/U 64 checks whether or not the driver operates the parking brake 51. In this case, if the parking brake 51 is not operated and therefore the parking brake switch 52a (P/B1) is off (step S9) the program proceeds to step S11 since the RBS is operable,. However, if the parking brake 51 is operated and therefore the parking brake switch 52a (P/B1) is on, the program proceeds to the conventional brake control mode (step S22) (if parking brake switch 52b is off as described below), where the RBS is prohibited from being used. This is because the car should not be started even if the accelerator pedal 54 is carelessly operated by the foot under the condition that the parking brake lever 51 is actuated.

On the other hand, it is checked whether or not another parking brake switch 52b is on for determining the transfer of the output torque of the pump/motor 14 to the car wheels 11 in the motoring mode with the parking brake acting in the hill start mode (step S10).

Figure 14:
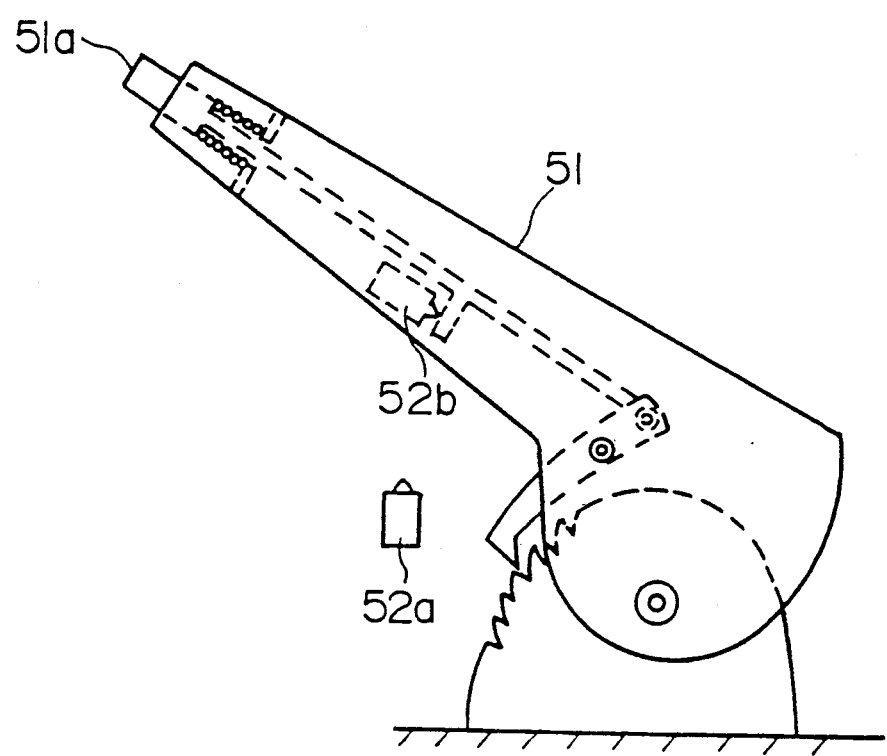
FIG. 14 is an outline diagram for explaining a parking brake lever.

It is to be noted that the parking brake switch 52b (P/B2) is rendered on only when the knob 51a of the parking brake lever 51 is depressed, as shown in FIG. 14. Namely, the condition that the knob 51a is depressed indicates the intention of the relief of the parking brake, so that the RBS should be operable even if the parking brake lever 51 is operated by hand while the parking brake switch 52a is on.

Next, the C/U 64 checks the selected gear position by means of the gear position sensor 38 and the gear shift stroke sensor 39 (step S11). If the gear position indicates N (neutral) or R (reverse), the program proceeds to the conventional brake control mode subroutine (step S22) without the control operation of the RBS. If the gear position indicates the 1st~5th gear, the RBS is usable, so that the program continues the control operation of the RBS.

Then, it is checked from the output of the car speed sensor 40 whether or not the car has stopped (step S12), and if the car is cruising, the program proceeds to step S14 to check whether or not the present car speed exceeds the permissible rotational speed of the pump/motor 14. This permissible rotational speed can be replaced by a car speed if the gear ratios of the PTO unit 8 and the axle 10 are fixed, because the pump/motor 14 is connected to the wheels through the electromagnetic clutch 13, the PTO shaft 12, the PTO unit 8, the propeller shaft 9 and the axle 10. Therefore, the permissible speed of the RBS is considered to be e.g. 50 km/h based on the multiplication of the permissible rotational speed of the pump/motor 14 with the gear ratio and the circumferential length of the wheels.

In step S14, if it is found that the car speed is lower than 50 km/h, or within the permissible speed of the pump/motor 14, the control operation of the RBS continues, while if it is found that the car speed exceeds the permissible speed, the conventional brake control mode subroutine in step S22 will be executed. It is to be noted that whenever this subroutine (step S22) is executed, the bit 2 of the flag FL-RBS in FIG. 16 is set to "1".

In step S12, if it is found that the car has stopped, a start prohibition subroutine will be executed (step S13). This subroutine is limited to the case where the car is a bus, and prohibits the hydraulic oil circuit from working when the bus opens its door. Namely it is executed so as to prohibit the bus from starting for the sake of passengers' safety, assuming that the passengers are getting on/off while the door is open, even if the accelerator pedal is carelessly operated by the foot.

Next, the C/U 64 checks the driver's brake pedal operation (step S15) and acceleration pedal operation in sequence (step S16), the respective pedal indicator signals having been processed in the analog signal processing subroutine in step S4. The reason why the checking step for braking has a priority to that of acceleration is that the braking mode should have a priority for the safety's sake of the car in case of the simultaneous operation of the brake pedal 57 and the acceleration pedal 54.

Figure 4:
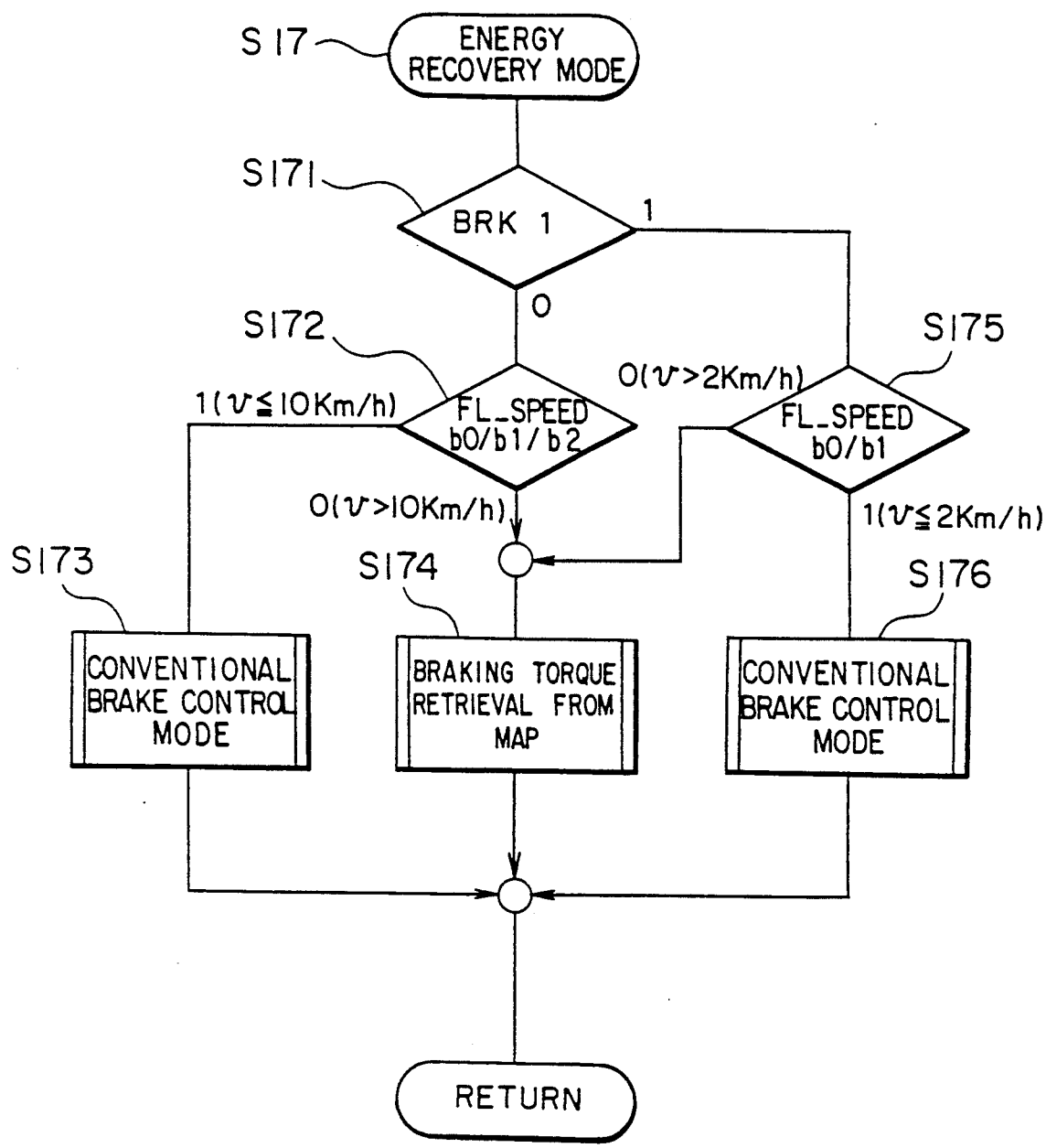
FIG. 4 is a flow chart of an energy recovery mode subroutine.

If it is found in step S15 that the brake pedal 57 is operated by the foot, an energy recovery mode subroutine shown in FIG. 4 will be executed (step S17).

In this subroutine, first of all, the bit 0 (BRK1) of the flag FL-PEDAL shown in FIG. 17 is checked (FIG. 4, step S171). This flag BRK1 is to be set when the energy recovery mode subroutine (step S17) is executed for the first time in the program in FIG. 3, and is to be reset when the first steps of the conventional brake control subroutine (step S22) and the energy regenerating control subroutine (step S20) are respectively executed. Thus, since it is 0 when the brake is used for the first time, a flag (FL-SPEED, see FIG. 15) is then checked as to car speed (step S172).

With low car speed (e.g. below 10 km/h) on such occasions as traffic jams where braking is frequently performed, the hydraulic controls become frequent correspondingly, so that for the reduction of the frequency of the use of the hydraulic system if any one of the bits 0, 1, 2 of the speed flag FL-SPEED is "1", the conventional brake control mode subroutine will be executed (step S173). This subroutine is the same as the subroutine of step S22 in the main program.

Figure 9:
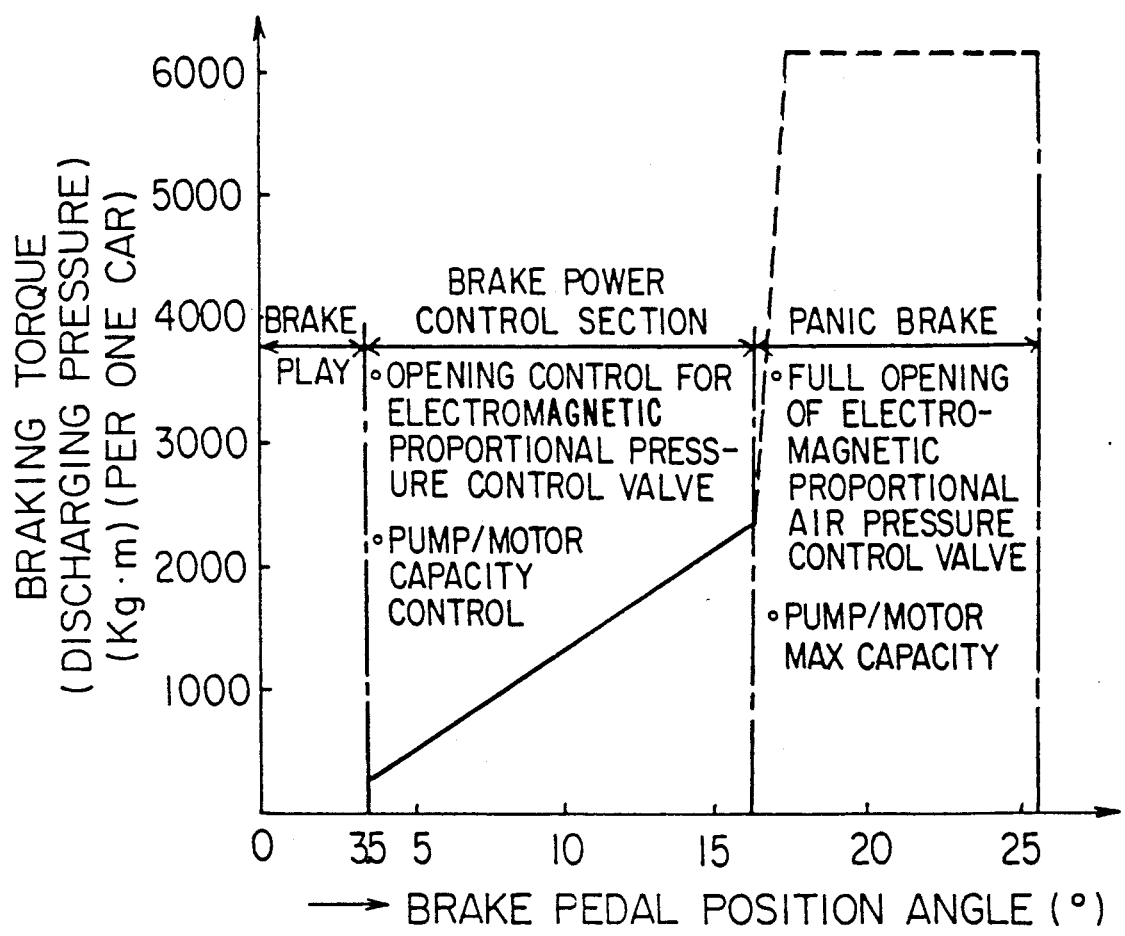
FIG. 9 is a map of braking torque vs brake pedal position.

When the car speed exceeds e.g. 10 km/h, that is any of the bits 0, 1, 2 is "0", a braking torque retrieval step is executed according to the braking torque map shown in FIG. 9 (step S174) in which braking torque that the driver intends to generate is determined from the position of the brake pedal 57 and is stored in the memory of the C/U 64.

Referring now to the brake torque map shown in FIG. 9, this map is stored in the memory in the C/U 64 based on the relationship between the position of the brake pedal 57, for example, such as an air brake or air oil brake, and the total braking torque for front and rear wheels per one car. Therefore, in this map, the foot operation of the pedal in the RBS is set to be equivalent to the actual foot operation of the air brake, or air oil brake etc. in the braking effectiveness in view of the feel of the pedal operation, and the passengers' comfort and safety.

In FIG. 9, the initial condition (e.g. 0~3.5°) of the foot position of the brake pedal 57 is regarded as a braking play where the output voltage of the brake pedal position sensor 59 attached to the brake pedal 57 is previously made "0" by the brake pedal switch 58. In excess of this initial condition (e.g. 3.5°), the above switch 58 is turned on whereby the sensor 5 provides an output voltage proportional to the pedal position. Therefore, the position of the brake pedal 57 can be detected from the output of the sensor 59.

The section after the initial condition of the position of the brake pedal 57 corresponds to a braking power control section (e.g. 3.5°~16°) where the pump/motor 14 is controlled at displacement. Namely, the braking torque T corresponding to the position of the brake pedal 57 is determined from the map.

The section (e.g. 16°~25°) in excess of the braking power control section corresponds to a panic braking mode where the electromagnetic proportional air pressure control valve 70 is forcibly depressed by a link mechanism (not shown) interconnected to the brake pedal 57 to interconnect the brake air tank 68 to a braking power generator, for example the air master cylinder 74 of an air oil type, which generates the maximum braking power based on the compressed air. At this time, the hydraulic oil circuit is excluded because it is possible that the car has an unstable condition.

In FIG. 4, the program proceeds to step S174 when the brake pedal is operated by the foot for the first time (flag BRK1=0) and it is found in step S172 that the car speed exceeds a predetermined low speed (e.g. 10 km/h), or when the brake pedal is continuously operated (flag BRK1=1) and it is found in step S175 that the car speed exceeds a minute speed (e.g. 2 km/h).

This is because although the energy recovered is little for the control operations of the hydraulic circuit in such a low car speed region as below 10 km/h in the initial condition (flag BRK1=0), after hydraulic braking is once effected by the pump/motor 14 (flag BRK1=1), it should be continued up to such a minute speed (2 km/h) over which the pump/motor 14 may stably rotate so as to recover the deceleration energy as much as possible.

If it is found in step S175 that the car speed becomes lower than the minute speed (2 km/h), the conventional brake control mode subroutine will be executed (step S176) by using the air brake or air oil brake. This subroutine is the same as the one in step S22 of the main program.

Figure 5:
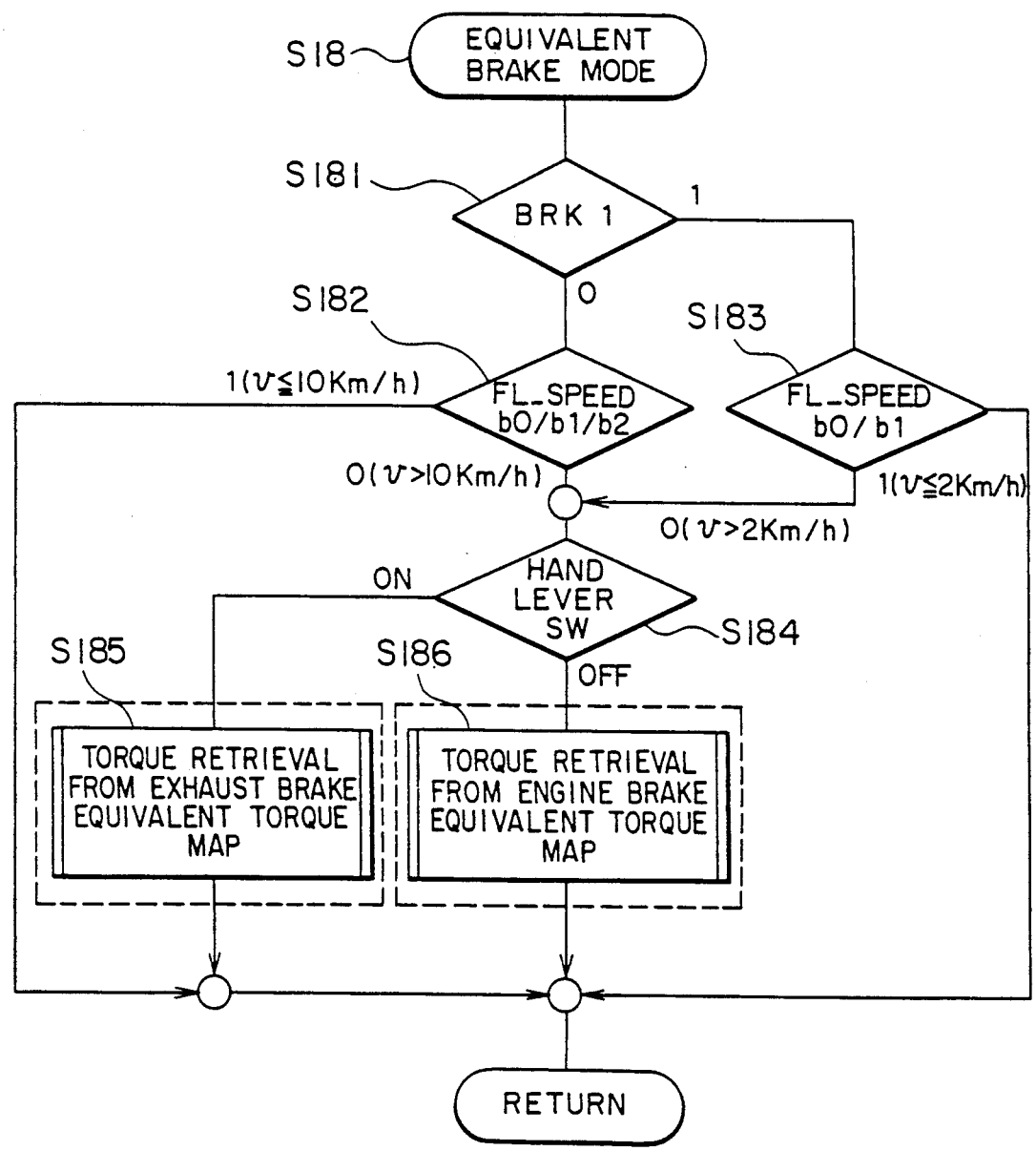
FIG. 5 is a flow chart of an equivalent (substitute) brake mode subroutine.

After the energy recovery mode subroutine has been thus executed, the C/U 64 executes an equivalent (substitute) brake mode subroutine shown in FIG. 5 (FIG. 3, step S18). This subroutine is to produce braking power equivalent to exhaust braking power or engine braking power.

The exhaust braking is auxiliary braking triggered by the hand lever 48 (or switch) provided at the driver's seat without operating the brake pedal 57, and the engine braking is also auxiliary braking for generating braking power as an engine load.

Namely, the RBS according to this invention performs the substitute control of the two auxiliary brakings as above noted by declutching the engine (see step S242 in FIG. 8) from the drive line of the wheels 11 in order to recover as much as possible the kinetic energy which the car has in the energy recovery mode.

In step S181 in FIG. 5, it is checked whether the hydraulic braking is effected for the first time as in step S171 in FIG. 4, on the basis of the bit 0 (BRK1) of the flag FL-PEDAL. Since the flags in steps S181 and S171 are the same, if the hydraulic braking has been initiated in either the subroutine S17 or S18, then the program will proceed to step S175 or S183 in the respective mode of step S17 or S18 where a continuous braking control is executed. In step S182 as with step S172, below a low speed region where the car speed is less than 10 km/h, i.e. any of the bits 0~2 of the flag FL-SPEED is "1", the hydraulic braking control is not initiated. On the other hand, in step S183 as with step S175, after the braking control by the pump/motor 14 has been once initiated (flag BRK1=1), hydraulic braking control is continued while the car speed is over the minute speed (e.g. 2 km/h) (the bit 0 or 1 of the flag FL-SPEED=0).

Then, it is checked whether or not the hand lever 48, which can be a switch, at the driver's seat is on (FIG. 5, step S184). If on, braking torque equivalent to that in the exhaust braking is retrieved from a map (step S185).

Figure 10A:
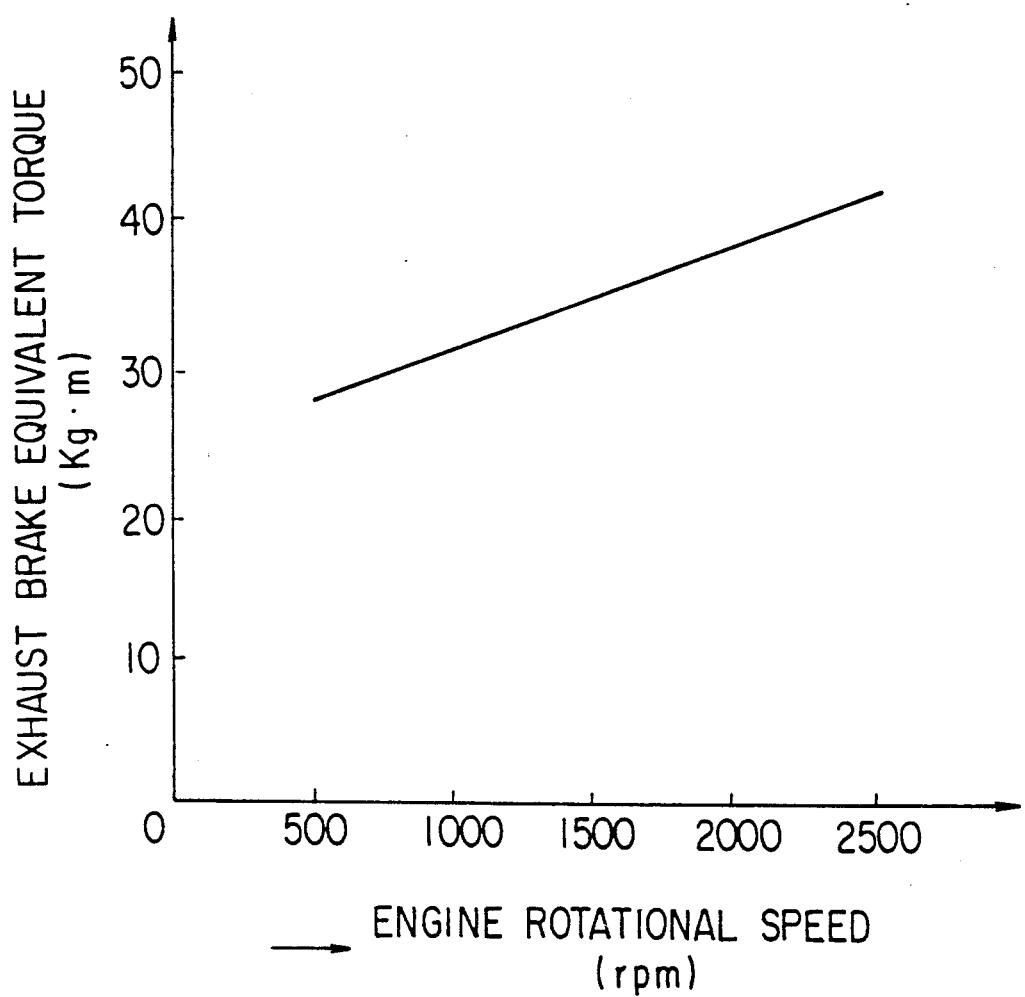
FIGS. 10A and 10B show maps of exhaust brake equivalent torque vs engine speed and car speed, respectively.
Figure 10B:
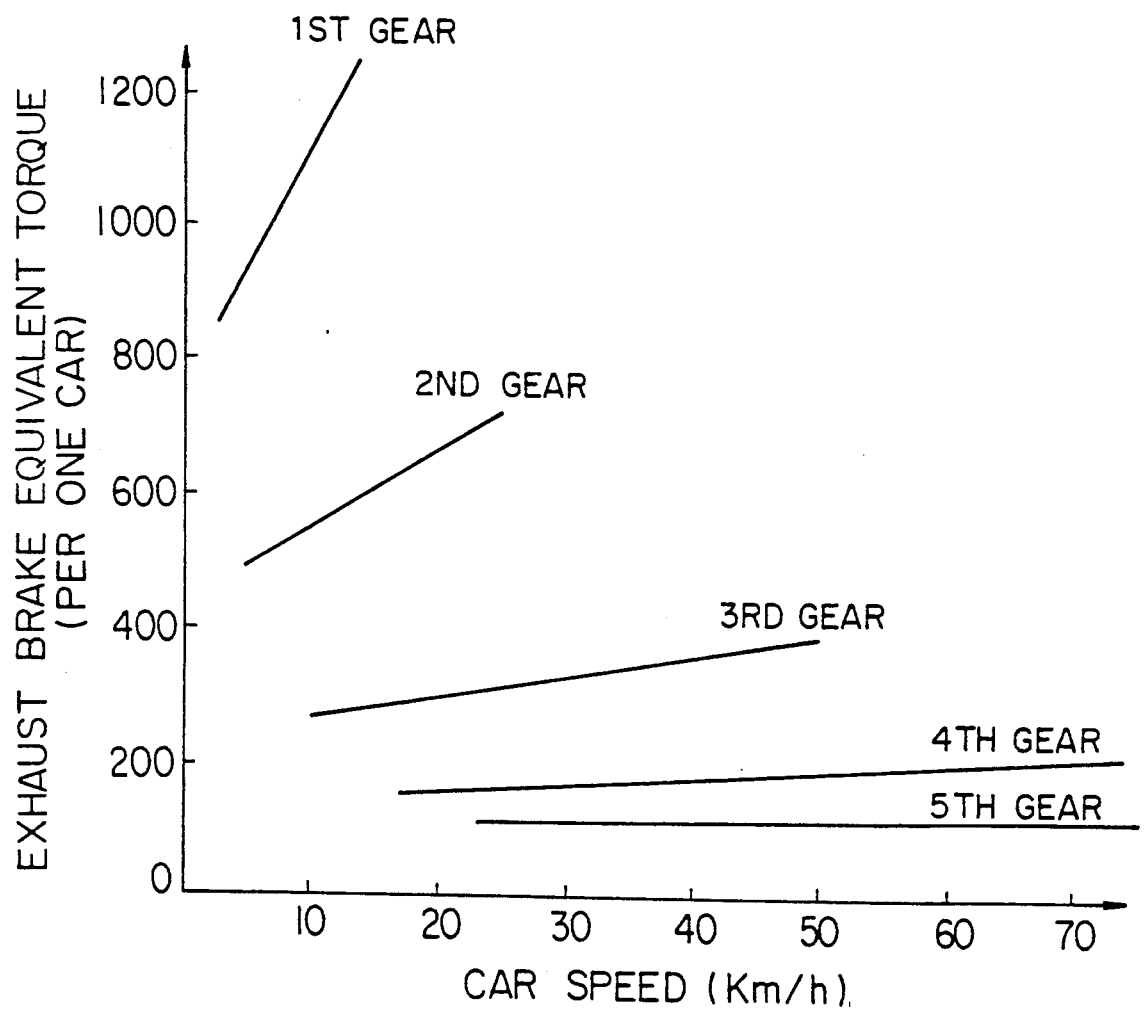

FIG. 10A shows the map of the exhaust brake equivalent torque in response to engine speed. This map indicates braking torque produced by the engine 1, so that in order to produce the braking torque at the wheels 11, as shown in FIG. 10B, this braking torque is stored in the memory in the C/U 64 as a net value which is obtained by the multiplication of the present gear position with the gear ratio of the final gear in response to car speed.

By the retrieval of the exhaust brake equivalent torque, substitute braking torque which corresponds to the actual exhaust braking is given for drivers who are accustomed to the exhaust braking.

Figure 11B:
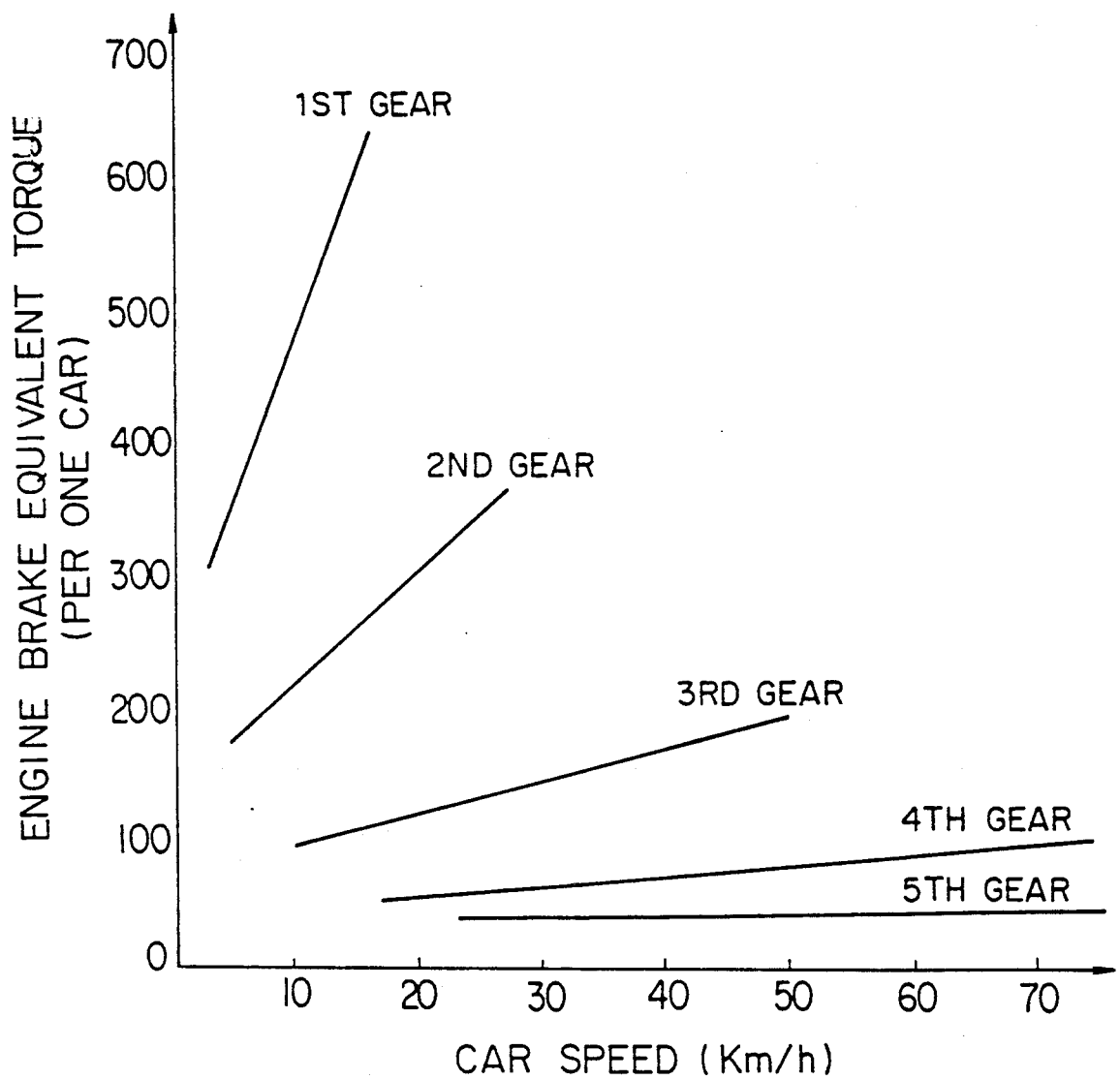
FIGS. 11A and 11B are maps of engine brake equivalent torque vs engine speed and car speed, respectively.
Figure 11A:
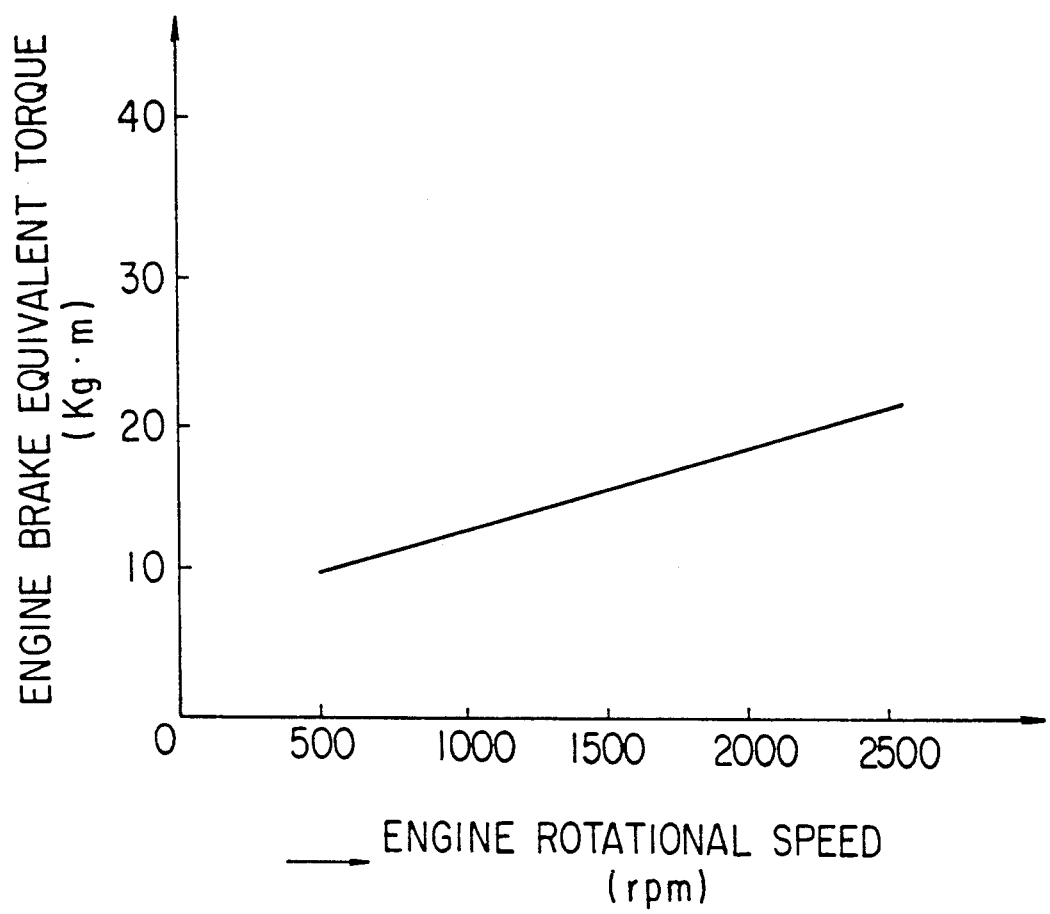

On the other hand, if it is found in step S184 that the hand lever 75 is off, braking torque equivalent to that in the actual engine braking is retrieved from the map shown in FIG. 11A (step S186).

FIG. 11A shows the map of the engine brake equivalent torque in response to engine speed. Since the map indicates braking torque produced by the engine 1, so that in order to produce the braking torque at the wheels 11, as shown in FIG. 11B, this braking torque is stored in the memory in the C/U 64 as a net value which is obtained by the multiplication of the present gear position with the gear ratio of the final gear in response to car speed.

As seen in FIG. 3, the program proceeds to the above equivalent braking subroutine in step S18 from the subroutine in step S17 if the brake pedal 57 is operated by the foot, or from the subroutine in step S16 if the acceleration pedal 54 is not operated, i.e. the acceleration pedal is positioned at the idle position respectively.

This equivalent brake mode subroutine (step S18) has nothing to do with the brake pedal operations such as in step S17 because of the substitute mode of auxiliary braking produced by the engine.

Namely, in either of exhaust braking or engine braking, the substitute power will be produced under the control of the output of the hand lever 48 unless the acceleration pedal 54 is operated. In other words, if the car cruises at a predetermined speed (e.g. 10 km/h or 2 km/h as shown in FIGS. 4 and 5) or more even when braking power is determined and generated, through step S21 and the following, corresponding to the position of the brake pedal in step S174, braking torque equivalent to the exhaust braking or engine braking will be further determined and additionally generated.

It is of course that if the car has the idle condition, the program will proceed to this equivalent braking torque subroutine from step S16 without passing through the subroutine in step S17.

Then, the C/U 64 executes a pump calculation subroutine (step S19, FIG. 3) which determines the capacity of the pump/motor 14 required to produce braking torque retrieved by the subroutine in steps S17, S18 according to the inner pressure of the hydraulic circuit.

Figure 6:
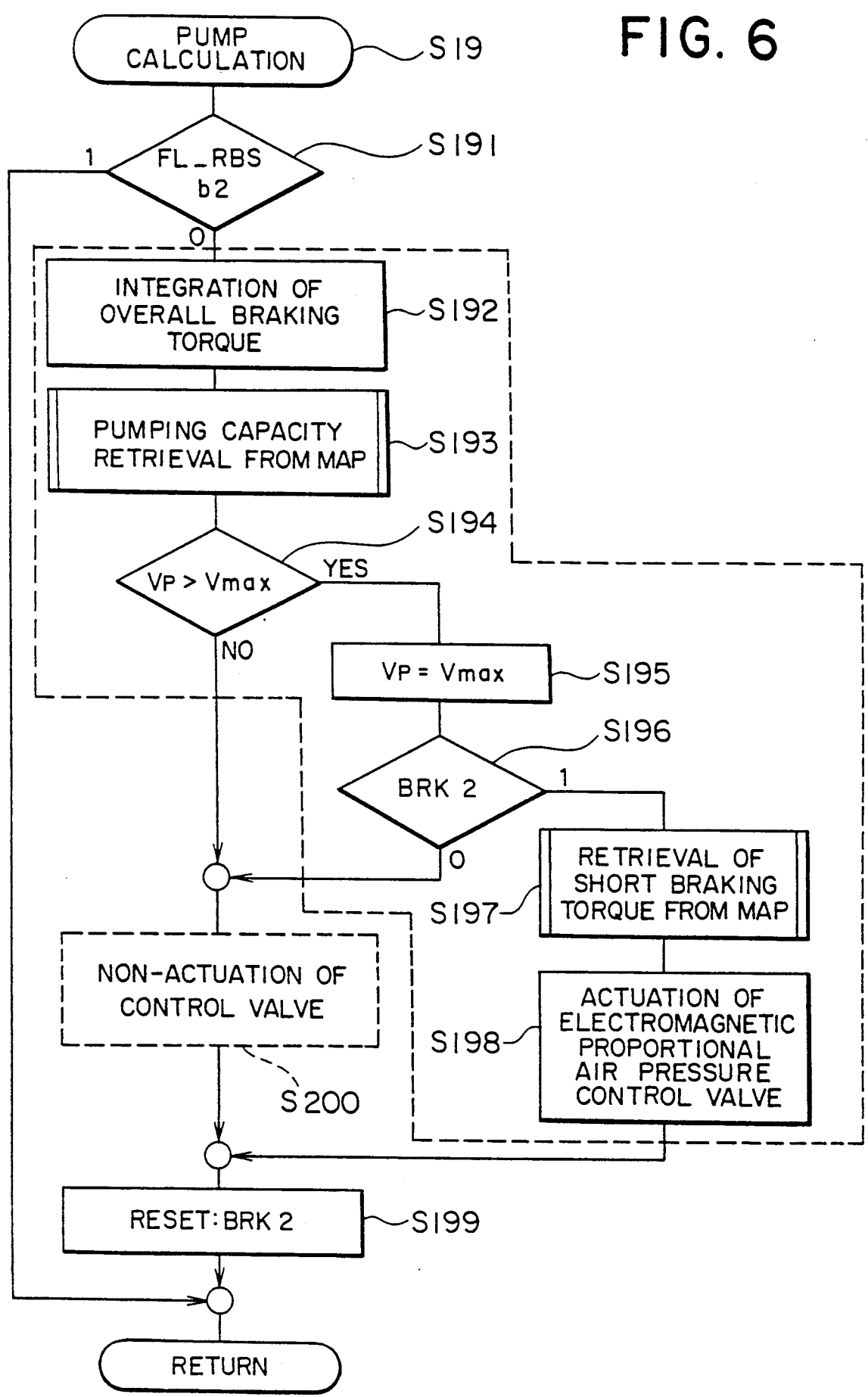
FIG. 6 is a flow chart of a pump calculation subroutine.

In this subroutine, it is firstly checked from the bit 2 of the flag FL-RBS whether or not the conventional brake control mode subroutine has been executed (FIG. 6, step S191), where if it is found that the subroutine has been executed, the program skips all of the steps in the subroutine S19 because the pump/motor 14 need not be controlled.

Then, if it is found in step S192 that the hydraulic braking control using the pump/motor 14 in the aforementioned steps S17, S18 has been carried out, respective braking torque retrieved in each of subroutines S17, S18 is integrated (step S192). Namely, overall braking torque required for the pump/motor 14 is calculated.

Next, the capacity $V_P$ of the pump/motor 14 is determined according to the following theoretical Equation (1) by using the torque T for the pump/motor 14 obtained from the necessary overall braking torque divided by the gear ratio of the final gear and the PTO unit.

$$V_P = 200\pi T/P \quad (1)$$

where

P: Inner oil pressure of hydraulic circuit detected by pressure sensor 47 (kg/cm$^2$), $V_P$: Capacity of pump/motor (cc), T: Required braking torque (kg/m).

Figure 12:
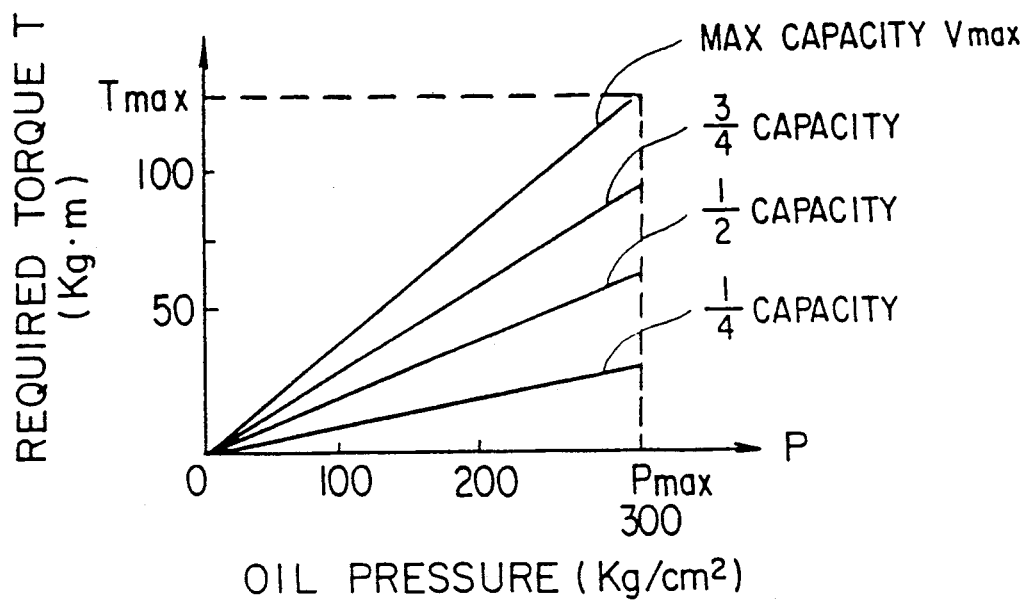
FIG. 12 is a braking torque map for a pump/motor in response to oil pressure.

However, since this calculation is complicated, the map of the above noted oil pressure, torque and capacity as shown in FIG. 12 is prepared by using Equation (1) to retrieve a necessary capacity $V_P$ from the oil pressure P and the required braking torque T.

This invention can utilize the pump/motor 14 of a swash shaft piston type or a swash plate piston type, so that the capacity $V_P$ is controlled by varying the displacement (incline) angle of the swash shaft (plate).

Then, it is checked in step S194 whether or not the capacity $V_P$ of the pump/motor 14 which has been retrieved from the above map exceeds the maximum capacity $V_{MAX}$ thereof, where if $V_P > V_{MAX}$, it is set that $V_P = V_{MAX}$ (step S195).

Then, the bit 1 (see BRK 2 in FIG. 17) of the flag FL-PEDAL is checked in step S196, and if the driver does not operate the brake pedal 57 (BRK2=0), this subroutine will go to step S200 even though the braking torque generated by the pump/motor 14 is less than the required torque, without compensating for the same.

On the other hand, if it is found in step S196 that the driver operates the brake pedal 57 (BRK2=1), this subroutine will go to step S197 where the short braking torque is retrieved from the map shown in FIG. 12 in order to supplement the same by the air brake or air oil brake.

Here, the method of the retrieval of the short braking torque in that map will be described referring to FIG. 13.

Figure 13:
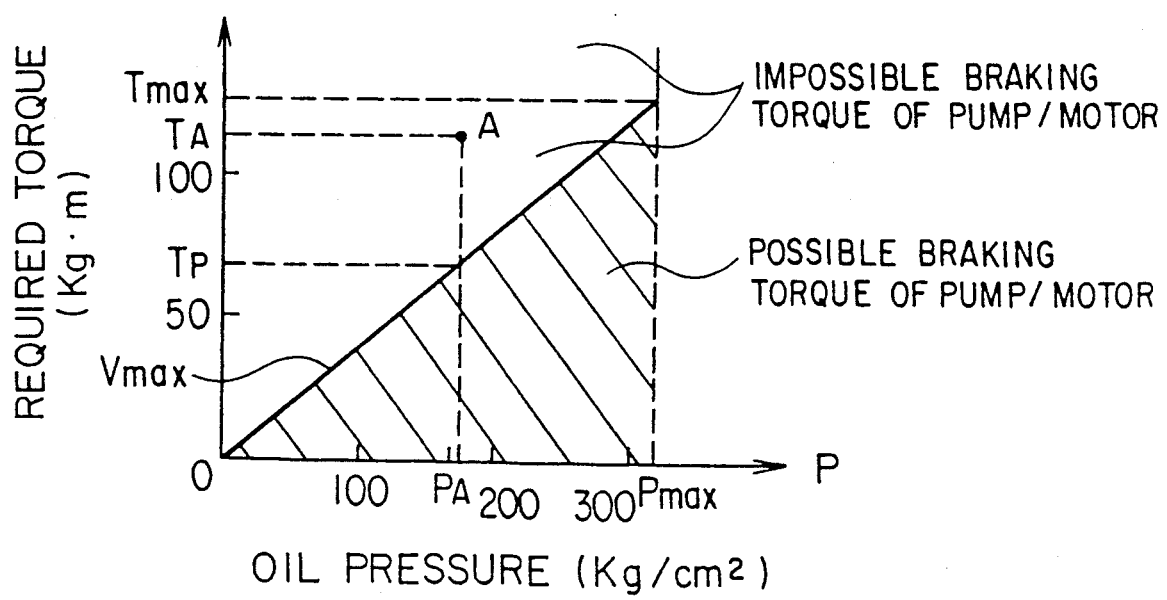
FIG. 13 is a map of braking torque which a pump/motor can produce.

In FIG. 13, if the inner pressure P of the oil circuit corresponding to the required braking torque T resides on or under the line of the maximum capacity $V_{MAX}$ of the pump/motor 14, i.e. within the area defined by the oblique lines, which indicates that $V_P \leq V_{MAX}$, the required braking torque, e.g. $T_P$, can be provided only by the pump/motor 14.

However, if it resides above the $V_{MAX}$ line like the required braking torque $T_A$, which indicates that $V_P > V_{MAX}$, such a required braking torque $T_A$ cannot be provided only by the pump/motor 14.

Accordingly, if $V_P > V_{MAX}$, the short braking torque, e.g. $T_A - T_P$, is retrieved, which will be dealt with as an air brake or an air oil brake.

In order that air power corresponding to the short braking torque retrieved in step S197 be generated and supplied from the air tank 68 into the air master cylinder 74, the electromagnetic proportional air pressure control valve 70 is actuated (step S198).

If it is found that $V_P \leq V_{MAX}$ in step S194 or the flag BRK2=0 in step S196, the control valve 70 will not be actuated but only the pump/motor 14 will perform the braking operation.

After the execution of the above subroutines, the C/U 64 will reset the flag BRK2 to "0" (step S199) and return to the main program in FIG. 3.

Returning to step S16 of the main program in FIG. 3, when the accelerator pedal 54 is operated by the foot, the C/U 64 executes an energy regenerative mode subroutine, in which deceleration energy as accumulated in the high pressure accumulator 26 is utilized for cruising the car (FIG. 3, step S20).

In this subroutine, the position of the accelerator pedal 54 is detected by the sensor 56 in each of the gear positions to determine a corresponding necessary torque, and the displacement angle (capacity) of the pump/motor 14 is determined from this torque and the present accumulated pressure of the hydraulic circuit.

It is to be noted in this subroutine that if the accumulated pressure of the hydraulic circuit is insufficient for the required cruising torque according to the acceleration pedal position, the C/U 64 clutches the engine 1 to supplement the corresponding shortage of torque.

Then, the main program executes the conventional brake control mode subroutine, as above noted, of step S22, in which mode only air braking or air oil braking is effected without hydraulic pressure.

Figure 7:
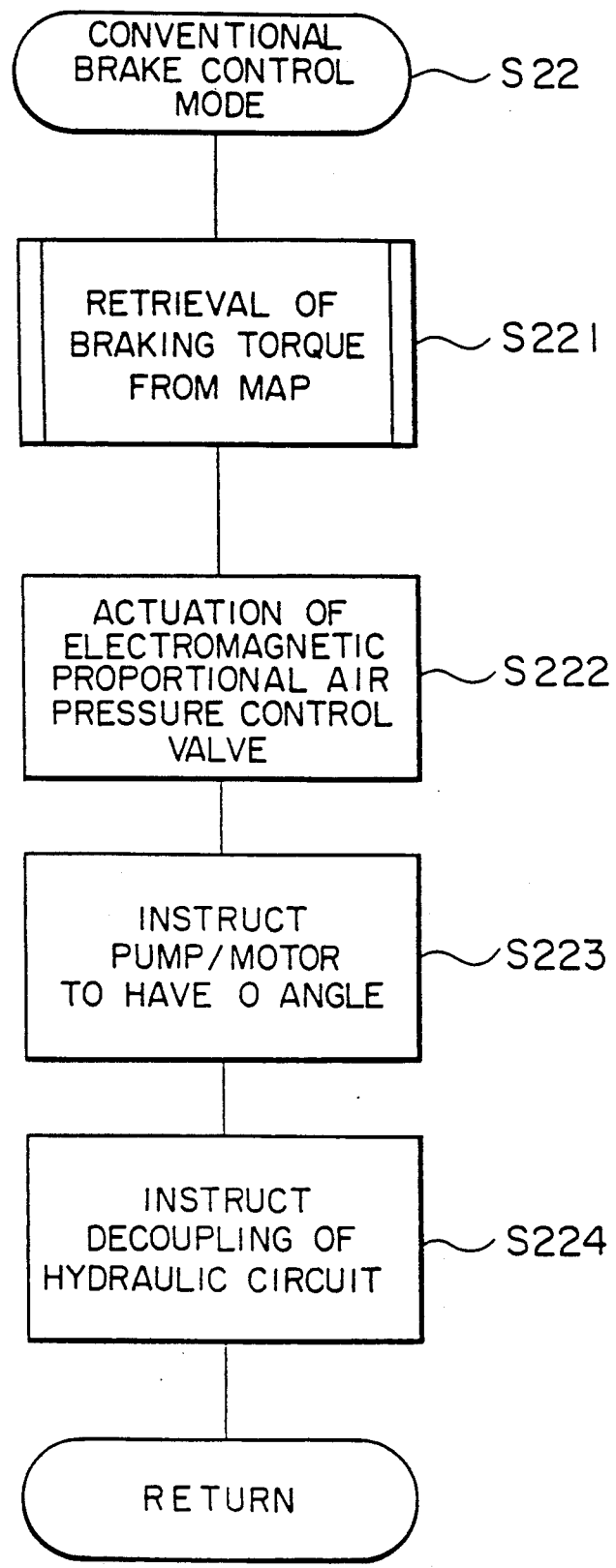
FIG. 7 is a flow chart of a conventional brake control mode subroutine.

As described in FIG. 7, in this subroutine corresponding necessary braking torque is retrieved from the map in FIG. 9 based on the position of the brake pedal 57

(FIG. 7, step S221). This map indicates a discharging characteristic curve such as in conventional air brake type cars (or air oil brake type cars), so that the thus retrieved braking torque corresponds to the discharging pressure of the electromagnetic proportional air pressure control valve 70 supplied to the air master cylinder 74 in case of e.g. air oil brake. It is to be noted that when the program proceeds to this subroutine from steps S8, S10, S11 and S14 in FIG. 3, the position of the brake pedal 57 should be given to determine the braking torque, i.e. the discharging pressure.

Next, based on the discharging pressure retrieved in step S221, the control valve 70 is actuated (step S222), and in order to make the hydraulic circuit off in view of this subroutine only dealing with air pressure, the displacement angle of the pump/motor 14 is made "0" (step S223) and the circuit switch valve 25 and the electromagnetic clutch 13 are made off (step S224), the program returning to FIG. 3.

After the above various controls, the C/U 64 performs an oil content control subroutine (FIG. 3, step S21). In this subroutine, whether or not oil replenishment is necessary is checked, depending on whether the oil content detection limit switch 45 is on or off to generate operation requests for the electromagnetic valve 31, 32.

Figure 18:
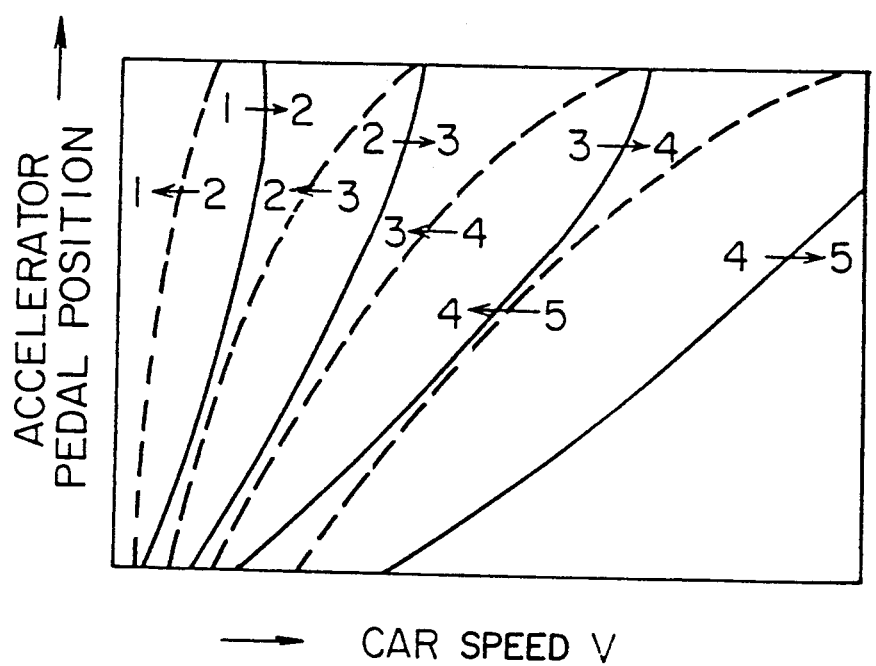
FIG. 18 is a known gear shift map based on car speed and accelerator pedal position.

Also, the C/U 64, as in well-known Japanese Patent Application laid-open No. 60-11769, reads a car speed signal from the car speed sensor 60, an acceleration signal corresponding to the foot position of the accelerator pedal 54 from the acceleration opening sensor 56, and a selection signal (matrix signal) from the gear selection lever 60, and selects an optimum gear position of the T/M 5 on the basis of the map shown in FIG. 18 prepared according to the car speed and the position of the acceleration pedal 54 (FIG. 3, steps S23 and S24).

This is accomplished by driving the clutch actuator 7 and the gear shift actuator 6 to decouple the engine clutch (not shown), by neutralizing the gear of the T/M 5, by selecting and shifting the gear to couple the engine clutch, whereby the gear position of the T/M 5 is automatically shifted up/down to a suitable one in accordance with the car speed and the position of the accelerator pedal 54.

Through the determination in the various subroutines as noted above, the C/U 64 actually controls the various components of the car.

Figure 8:
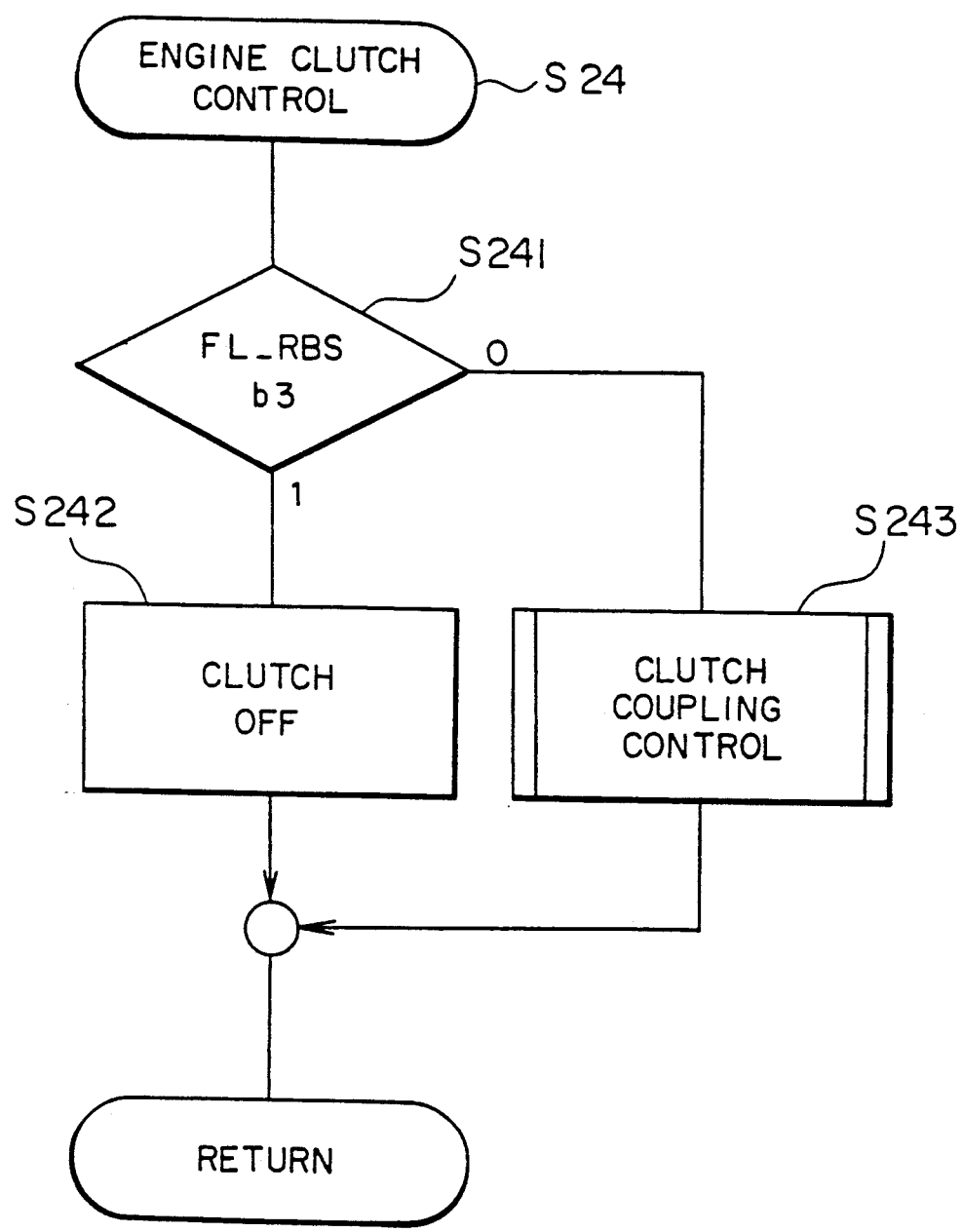
FIG. 8 is a flow chart of a determination subroutine for a clutch control method.

Namely, the C/U 64 declutches the engine 1 on the basis of a determining subroutine for a clutch control method shown in FIG. 8 if the bit 3 of the flag FL-RBS is "1" (FIG. 8, step S241) only for the hydraulic cruising (step S242). The bit 3 of the flag Fl-RBS is, as shown in FIG. 16, set necessarily in the energy recovery mode in step S17 and is set in a case where the car cruises only with hydraulic pressure in the energy regenerative mode in step S20.

It is to be noted that an automatically clutched auto-transmission car is already known for coupling/decoupling the engine clutch, while even a car without an auto-transmission may be used with only the engine clutch being automatically coupled/decoupled. Furthermore, in case of a fluid type auto-transmission car, the decoupling of the engine is similarly effected with the gear being controlled at neutral.

Subsequently, in accordance with the capacity of the pump/motor 14, the connection/disconnection of the electromagnetic clutch 13, and the switching position of the circuit switching valve 25 that have already been determined in the above mentioned energy recovery mode, regenerative mode, conventional brake control mode etc., the program executes a hydraulic circuit control subroutine for actually driving these components.

This hydraulic circuit control subroutine actually controls the circuit switching valve 25, the pump/motor 14, and the electromagnetic clutch 13 forming the hydraulic circuit on the basis of the above noted various judgements and calculated results.

After the hydraulic circuit control (step S25), the program executes an idle control subroutine in which the C/U 64 reads the signals from the directly linked cooling relay switch 33 and the water temperature sensor 34 to stabilize the idling rotation during cooling in the idling mode of the engine 1 and also to stabilize the idling rotation in the driving mode of the replenishing pump 30 (step S26).

Then, the target position of the step motor 3 for fuel injection is set according to the output torque of the engine 1 determined in the above energy regenerative mode etc. to execute and engine control subroutine (step S27).

In this case, the engine 1 is controlled at an idling mode when the capacity of the pump/motor 14 determined in the above energy regenerative mode is lower than 250 cc (V<250 cc), while controlled to produce a necessary output determined from the following Equation (2) when V >250 cc.

$$\text{Engine ouptut required} = ((T/M \text{ output required}) - \quad (2)$$

$$(\text{maximum output of pump/motor})) \times$$

$$(PTO \text{ gear ratio})/(T/M \text{ gear ratio})$$

This engine output is obtained by a fuel injection governor driven by the step motor after the conversion into the position of the accelerator pedal.

After the aforementioned control and processing, an indicator control subroutine is executed which includes indications for the hydraulic pressure and power source (oil pressure, engine) and controls the indications of the indicators 63 (step S28).

An HSA control subroutine is executed to close HSA valve 72 to retain the braking condition under the condition that the car speed is stopped and the brake pedal 57 is operated, and which relieves the braking condition under the condition that the accelerator pedal 54 is operated by the foot, or the gear selection lever 60 is positioned at the neutral (step S29).

After this, the program checks whether or not the timing for the execution of self diagnoses has elapsed (step S30), and when the timing lapses, such self diagnoses is periodically (e.g. 500 ms) executed (step S31). After a waiting time for making the processing time fixed (step S32), the program returns to step S2 for the repetition of the above processings.

It is to be noted that the above subroutines (step S23~31) may be applied with presently known art.

We claim:

1. A regenerative braking system for a car having a brake pedal, a power take-off unit, and an engine, comprising:
   a hydraulic oil circuit formed of:
      a high pressure accumulator;
      a pump/motor;

a circuit valve coupled to said pump/motor and said high pressure accumulator; and a low pressure accumulator coupled to said circuit valve;

an electromagnetic clutch, coupled to said pump/motor, for connecting or disconnecting said pump/motor to or from the power take-off unit;

means for sensing the operation of the brake pedal;

an electromagnetic proportional air pressure control valve;

means for generating air brake power under the control of said electromagnetic proportional air pressure control valve; and control means for determining overall braking torque required for said pump/motor in a braking mode of the car, for determining a pumping capacity of said pump/motor corresponding to the determined overall braking torque, for decoupling the engine of the car, for closing said hydraulic oil circuit, for coupling said electromagnetic clutch, for controlling said pump/motor to have a maximum pumping capacity, and for controlling said electromagnetic proportional air pressure control valve to supplement a difference between the maximum pumping capacity and the determined pumping capacity when the determined pumping capacity exceeds the maximum pumping capacity and said sensing means senses the operation of the brake pedal.

2. A regenerative braking system for a car according to claim 1, wherein said control means includes therein a stored map for defining the relationship between the position of the brake pedal and braking torque.

3. A regenerative braking system for a car according to claim 1, wherein said sensing means senses the position of the brake pedal, and wherein said control means integrates the braking torque required in response to the sensed position of the brake pedal when the car speed exceeds a predetermined speed.

4. A regenerative braking system for a car according to claim 3, wherein the car has an exhaust brake and a transmission, further including:

manual operating means for operating the exhaust brake;

means for sensing car speed;

means for sensing an inner pressure of said hydraulic oil circuit; and means for sensing a gear position of the transmission, wherein said control means further integrates an exhaust brake equivalent torque corresponding to the car speed, the inner pressure, and the gear position when said manual operating means is operated and the car speed exceeds the predetermined speed.

5. A regenerative braking system for a car according to claim 3, wherein the car has an exhaust brake and a transmission, further including:

manual operating means for operating the exhaust brake;

means for sensing car speed;

means for sensing an inner pressure of said hydraulic oil circuit; and means for sensing a gear position of the transmission, wherein said control means further integrates an engine brake equivalent torque corresponding to the car speed, the inner pressure, and the gear position when said manual operating means is not operated and the car speed exceeds the predetermined speed.

6. A regenerative braking system for a car according to claim 1, wherein said control means integrates the braking torque when the car speed exceeds a predetermined speed.

7. A regenerative braking system for a car according to claim 1, wherein said control means switches over said circuit valve so that said hydraulic oil circuit has a hydraulic flow from said low pressure accumulator to said high pressure accumulator.

8. A regenerative braking system for a car according to claim 1, wherein said car has an engine clutch and wherein said control means controls the engine clutch to decouple the engine.

9. A regenerative braking system for a car having a brake pedal and a power take-off unit, comprising:

a hydraulic oil circuit formed of:

a high pressure accumulator;

a pump/motor;

a circuit valve, coupled to said pump/motor and said high pressure accumulator; and a low pressure accumulator coupled to said circuit valve;

an electromagnetic clutch, coupled to said pump/motor, for connecting or disconnecting said pump/motor to or from the power take-off unit;

means for sensing the position of the brake pedal;

an electromagnetic proportional air pressure control valve;

means for generating air brake power under the control of said electromagnetic proportional air pressure control valve;

means for sensing car speed; and control means for controlling said electromagnetic proportional air pressure control valve to perform conventional braking responsive to the position of the brake pedal by making said hydraulic circuit inactive and decoupling said electromagnetic clutch when the car speed is below a first predetermined speed when the brake pedal is operated before said hydraulic oil circuit has been activated, said control means performing conventional braking responsive to the position of the brake pedal by making said hydraulic oil circuit inactive when the car speed is below a predetermined second speed which is lower than the predetermined first speed while the hydraulic oil circuit is activated.

10. A regenerative braking system for a car according to claim 9, wherein said control means includes therein a stored map defining the relationship of the position of the brake pedal and braking torque.

11. A regenerative braking system for a car according to claim 9, wherein said control means performs the conventional braking when the car speed exceeds a permissible speed for said pump/motor.

12. A regenerative braking system for a vehicle having a brake pedal, an engine, and a power take-off unit, comprising:

a hydraulic circuit including a pump/motor;

a clutch, coupled to said pump/motor, for connecting or disconnecting said pump/motor to or from the power take-off unit;

means for sensing the actuation of the brake pedal;

an electromagnetic control valve;

means for generating conventional braking torque under the control of said electromagnetic control valve; and control means for determining an overall braking torque required for said pump/motor in a braking mode of the car, for determining a pumping capacity of said pump/motor corresponding to the determined overall braking torque, said control means coupling said clutch to said pump/motor and actuating said hydraulic circuit so that said pump/motor has a maximum pumping capacity, said control means controlling said control valve to supplement a difference between the maximum pumping capacity and the determined pumping capacity when the determined pumping capacity exceeds the maximum pumping capacity and said sensing means senses the operation of the brake pedal.

13. A regenerative braking system for a vehicle according to claim 12, wherein said control means includes therein a stored map for defining a relationship between the position of the brake pedal and braking torque.

14. A regenerative braking system for a vehicle according to claim 12, wherein said sensing means senses the position of the brake pedal, and wherein said control means integrates the braking torque required in response to the sensed position of the brake pedal when the vehicle speed exceeds a predetermined speed.

15. A regenerative braking system for a vehicle having a brake pedal and a power take-off unit, comprising:
 a hydraulic circuit including a pump/motor;
 a clutch, coupled to said pump/motor, for connecting or disconnecting said pump/motor to or from the power take-off unit;
 means for sensing the position of the brake pedal;
 an electromagnetic control valve;
 means for generating conventional braking torque under the control of said electromagnetic control valve;
 means for sensing vehicle speed; and
 control means for controlling said electromagnetic control valve to provide conventional braking responsive to the position of the brake pedal by deactivating said hydraulic circuit and decoupling said clutch when the vehicle speed is below a first predetermined speed when the brake pedal is operated before said hydraulic circuit has been activated, said control means performing conventional braking responsive to the position of the brake pedal by making said hydraulic circuit inactive when the vehicle speed is below a predetermined second speed which is lower than the predetermined first speed, while the hydraulic circuit is activated.

16. A regenerative braking system for a vehicle according to claim 15, wherein said control means includes therein a stored map defining the relationship of the position of the brake pedal and braking torque.

17. A regenerative braking system for a vehicle according to claim 15, wherein said control means performs the conventional braking when the vehicle speed exceeds a permissible speed for said pump/motor.

* * * * *

UNITED STATES PATENT AND TRADEMARK OFFICE
CERTIFICATE OF CORRECTION

PATENT NO. : 5,050,936

DATED : SEPTEMBER 24, 1991

INVENTOR(S) : KOJI TANAKA ET AL.

It is certified that error appears in the above-identified patent and that said Letters Patent is hereby corrected as shown below:

Col. 1, line 37, "necesarily" should be --necessarily--.

Col. 4, line 1, "show" should be --are--.

Col. 13, line 29, "60," should be --40,--.

Signed and Sealed this

Sixteenth Day of March, 1993

Attest:

STEPHEN G. KUNIN

Attesting Officer

Acting Commissioner of Patents and Trademarks